US012566772B2

(12) United States Patent
Evans et al.

(10) Patent No.: US 12,566,772 B2
(45) Date of Patent: Mar. 3, 2026

(54) SYSTEMS AND METHODS FOR DATA INGESTION FOR SUPPLY CHAIN OPTIMIZATION

(71) Applicant: Oii, Inc., Oakland, CA (US)

(72) Inventors: David Michael Evans, Welwyn Garden City (GB); Robert Derward Rogers, Oakland, CA (US); Vishnuvyas Sethumadhavan, Mountain View, CA (US); Mehran Najafi, Novato, CA (US)

(73) Assignee: OII, INC., Oakland, CA (US)

( * ) Notice: Subject to any disclaimer, the term of this patent is extended or adjusted under 35 U.S.C. 154(b) by 238 days.

(21) Appl. No.: 18/471,117

(22) Filed: Sep. 20, 2023

(65) Prior Publication Data

US 2024/0112110 A1     Apr. 4, 2024

Related U.S. Application Data

(60) Provisional application No. 63/410,188, filed on Sep. 26, 2022.

(51) Int. Cl.
G06F 16/25 (2019.01)

(52) U.S. Cl.
CPC .................................... G06F 16/25 (2019.01)

(58) Field of Classification Search
CPC ...................................................... G06F 16/25
See application file for complete search history.

(56) References Cited

U.S. PATENT DOCUMENTS

| 11,645,611 | B1 * | 5/2023 | Puthiyapurayil | ........ | G06N 5/01 |
| | | | | | 705/28 |
| 2018/0150769 | A1 * | 5/2018 | Ahuja | .................... | G06N 20/00 |
| 2022/0148059 | A1 * | 5/2022 | Faricy | ................ | G06Q 30/0631 |
| 2022/0405790 | A1 * | 12/2022 | Russell | .............. | G06Q 30/0206 |

* cited by examiner

*Primary Examiner* — Courtney Harmon
(74) *Attorney, Agent, or Firm* — IP Strategy Consulting

(57) ABSTRACT

The present invention relates to systems and methods for ingesting of raw client data into a supply chain optimization system. The client enterprise data system (EDS) provides raw data, typically in tabular format across many files, to a data management module of the optimization system. This data is then profiled. and a set of mapping AI models is applied to the profiled data. Each of the plurality of mapping AI models corresponds to a single input feature of the optimization model. As the mapping models are applied, a live preview is generated. This live preview is reviewable by a human operator, and human input can be provided. When there is input, the individual mapping model is updated (without impacting the other mapping models), and a new live preview for that given feature is generated. The resulting standardized feature set may be consumed by the supply chain optimization model.

18 Claims, 13 Drawing Sheets

100

Orchestrated Intelligent Supply Chain Ecosystem

300

400

600

700

RETRIEVE CUSTOMER DATA
710

PERFORM DATA INGESTION
715

APPLY AI MODELS FOR OPTIMIZATION
720

RESULTS PRESENTATION
730

715

810

820

840

720

From 715

PRODUCT SEGMENTATION
1210

ADJUDICATE SEGMENTATION
1220

IDENTIFY CONSTRAINTS
1230

CHARACTERIZE SUPPLY CHAIN PORTIONS
1240

PREDICT PERFORMANCE
1240

To 730

SYSTEMS AND METHODS FOR DATA INGESTION FOR SUPPLY CHAIN OPTIMIZATION

CROSS REFERENCE TO RELATED APPLICATION

This application entitled "SYSTEMS AND METHODS FOR DATA INGESTION FOR SUPPLY CHAIN OPTIMIZATION", claims the benefit and priority of U.S. Provisional Application No. 63/410,188 entitled "SYSTEMS AND METHODS FOR DATA INGESTION FOR SUPPLY CHAIN OPTIMIZATION", filed Sep. 26, 2022, the contents of which is incorporated herein in its entirety by this reference.

BACKGROUND

The present invention relates to systems and methods for orchestrating an intelligent supply chain optimizer.

Configuring a supply chain planning system correctly is a complex task and one that most planning systems do not address. Identifying and configuring the optimal supply chain requires multivariate mathematical modeling and a near infinity of potential settings, despite this supply chains typically are configured manually. Supply chain planning systems rely on Planners to set the right parameters even though failure to find the optimal parameters results in ineffective plans that will propagate across the network, regardless of the effectiveness of the software.

It is a significant problem to rely upon a planner for supply chain management because finding the right configuration—even in relatively simple supply chains—is extremely difficult to achieve. There are simply too many variables to consider and multitude of potential service versus cost outcomes. In addition, real-world supply chains are often global, making the task exponentially more complicated. Even for experienced planners this is an insurmountable challenge.

As a result, many supply chains are set up and planned in a significantly suboptimal way, resulting in a combination of issues such as Service Failures and Missed Sales, Overstocks on some items and under-stock on others, Factory Inefficiencies, Reactive rather than Strategic Plans, and High Costs of Waste (for example when products expire while in inventory).

Identifying an optimal set up requires detailed evaluation of the cost versus service implications of the millions of potential configuration options across the end-to-end supply chain network encompassing dimensions such as Supply Chain Variability, Network Design, Product segmentation, Inventory Strategy, Factory sequence and rhythm.

Artificial Intelligence and machine learning techniques (AI/ML) are a new generation of algorithms that demonstrate self-learning and the capability to make decisions. Its power is its ability to process multiple data inputs simultaneously and to use this information to compare outcomes, make informed choices and to self-correct so that those choices improve over time.

However, even with the most sophisticated AI/ML algorithms, the output is limited to the quality of data that is fed into the system (known as the "garbage-in-garbage-out" phenomena). One issue with proper data ingestion is that the type, quality and format of the input data varies significantly between different enterprises. For multiple clients, and always changing datasets, performing these ingestion processes becomes quickly untenable—requiring significant subject matter experts (SME) time and involvement. SMEs are extremely expensive to utilize, and this adds to the impracticality of manually ingesting data.

It is therefore apparent that there is an urgent need to use Artificial Intelligence (AI) in particular ways to improve the data ingestion process for downstream supply chain optimizations. Such systems and methods dramatically reduce the time and resources required for data ingestion as compared to traditional manual data entry.

SUMMARY

To achieve the foregoing and in accordance with the present invention, systems and methods for improvements and automations of data ingestion for a supply chain optimizer is provided. Such systems and methods dramatically increase efficiency and accuracy of data ingesting into a useful format for AI systems, saving significant time and money over traditional data ingestion techniques.

In some embodiments, the client enterprise data system (EDS) provides raw data, typically in tabular format across many files, to a data management module of the optimization system. The raw data is non-standardized. This data is stored, and then profiled. Profiling involves disambiguating the headers of the tables, imputing values into the tables, and characterizing the table data. Disambiguation includes conceptual clustering of names contained in the headers. Disambiguation may also include matching the data values under the header to a header type. Imputation of values may be performed for clear errors in the data, for granularization or aggregation based upon feature needs, or imputation of data for null values. This includes determining if a null value is a true zero, an error, or non-data. For any imputed values, the system may determine if there is significant sensitivity by the optimization model to the imputed value. When there is, the system may notify the client of the need for better/more accurate data for those data types.

Subsequently, a set of mapping AI models is applied to the profiled data. Each of the plurality of mapping AI models corresponds to a single input feature of a supply chain optimization model. As the mapping models are applied, a live preview is generated. This live preview is reviewable by a human operator, and human input can be provided. When there is input, the individual mapping model is updated (without impacting the other mapping models), and a new live preview for that given feature is generated.

After all features have been properly mapped, the resulting standardized feature set may be consumed by a supply chain optimization model. This generates a set of recommendations for the client as to how best to improve their supply chain. The most impactful changes are highlighted and pressed upon the client by their EDS system.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

Figure 1:
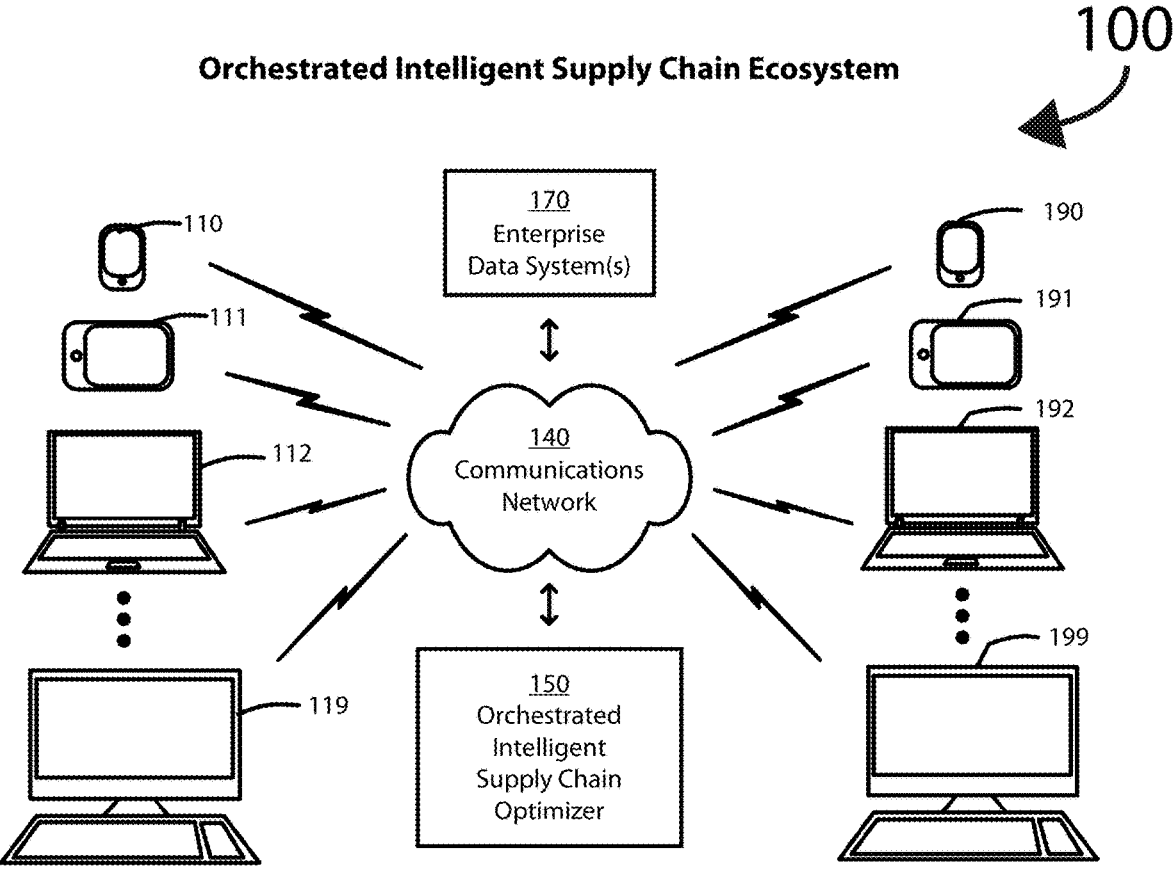
FIG. 1 is a block diagram illustrating an Orchestrated Intelligent Supply Chain Ecosystem, in accordance with one embodiment of the present invention.

The present invention relates to systems and methods for orchestrating an intelligent optimized supply chain. To facilitate discussion, FIG. 1 is a block diagram of an Orchestrated Intelligent Supply Chain Ecosystem 100 illustrating an Orchestrated Intelligent Supply Chain Optimizer 150 coupled to Enterprise Data System(s) 170 and stakeholders' communication devices 110 to 119 and 190 to 199 via a communication network 140 such as the Internet, wide area network, cellular network, corporate network, or some combination thereof. Depending on the implementation, exemplary stakeholders can include one or more groups of managers (including, but not limited to, operations managers, supply chain managers, IT managers), planners, data scientists, data miners, data engineers, data providers, manufacturers, distributors, and retailers.

Figure 2:
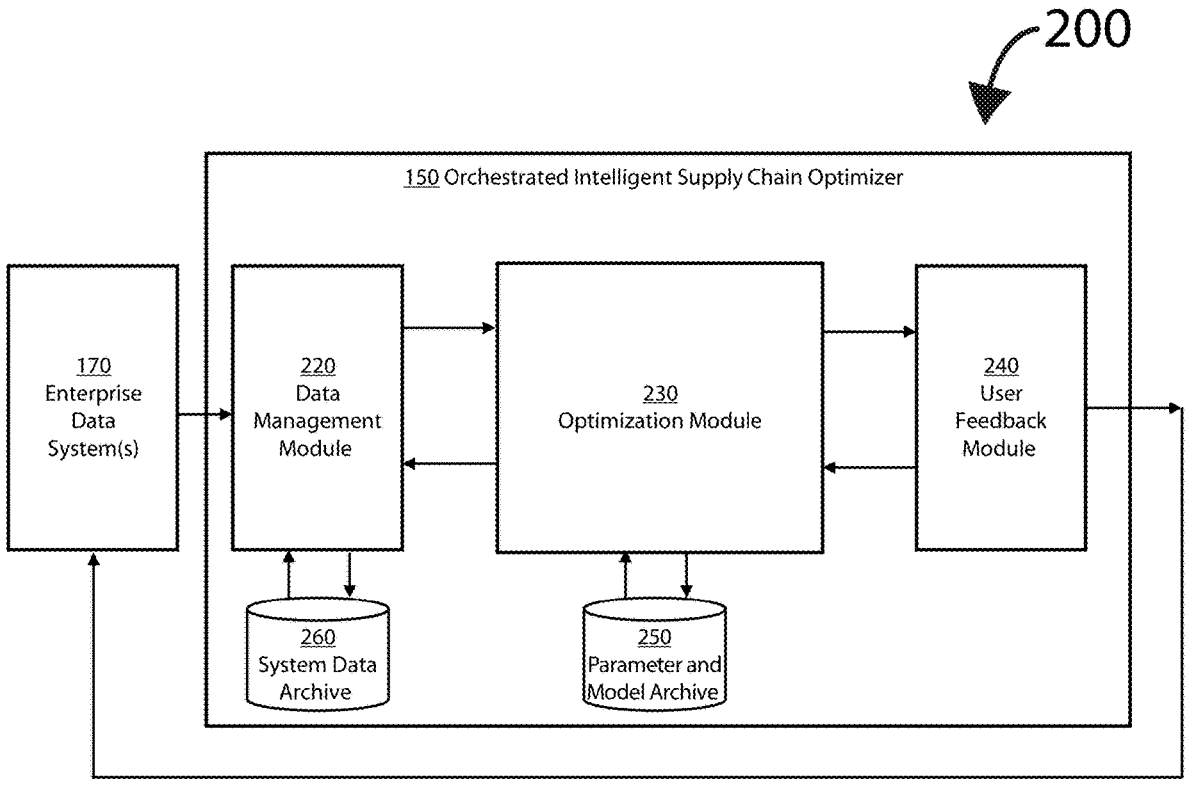
FIG. 2 is a block diagram illustrating one embodiment of an Optimizer for the Ecosystem of FIG. 1.

The core of the supply chain optimizer 150 is presented in greater detail in reference to FIG. 2. The enterprise data systems 170 from various third-party entities who are seeking supply chain optimization (commonly referred to as "clients" or "customers") provides information regarding the client's existing supply chain to the optimizer 150. This data is initially provided to the data management module 220 for ingestion. The data provided from the enterprise data system(s) 170 is in an unusable form for the downstream optimization module 230. Generally, each client has different outputs of their supply chain data based upon the backend system (or systems) they employ, and due to personalization and customizations to the data format and content. This creates a significant hurdle for the supply chain optimizer 150 ultimate usage of the client's data. The data management module 220 solves these issues through complicated AI-driven data ingestion techniques. These processes will be discussed in greater detail below in reference to following figures.

After the data has been ingested by the data management module 220, copies of relevant formatted data are stored in the system data archive 260. The system data archive includes a myriad of necessary data, including historical demand data, historical forecast data, historical inventory levels at different locations (nodes) in the supply chain for different products, supply chain site information, supply chain product information, information on linkages between sites including transport times, transport time variability, transport methods and costs, supply chain configuration parameters (e.g. replenishment strategies and the parameters for each strategy at each location for each product), product cost of goods sold ("COGS"), product retail or list price at each location, factory changeover costs, carbon emission by different components of the supply chain, service level targets, market segmentation for products, among many others.

The optimization module 230 performs the heavy lifting of the optimization process. It consumes the cleansed, formatted and aggregated data from the data management module 220 and performs the optimization of the supply chain, leveraging AI/ML models, subject to specific constraints. These constraints, models, and other parameters are stored in a parameter and model archive 250. As the models are developed, implemented, and feedback is received—the models may be trained on said feedback. The updated models are then stored, typically in a versioned manner, back in the parameter and model archive 250 for subsequent usage.

Output of the optimization module 230 is generally fed to the user feedback module 240 for presentation of the results, and importantly, pushing the recommendations to the enterprise data system 170 of relevance for implementation of the recommendations. This results in a feedback loop, where the resulting impacts of the adopted recommendations are fed back into the system, and the models may be refined based upon the actual impacts measured (vs the modeled/expected impacts). With improved models, and changes in conditions, the process repeats with optimization and output.

In addition to pushing the recommendations to the client, the user feedback model 240 is able to provide analysis of the actual impacts of the supply chain (e.g., cost, service levels, inventory levels per node, changeover events, etc.) versus what is expected based upon the optimized parameters. This enables the client to visualize and react to the optimized conditions, and in some embodiments, engage in modulating possible parameters in order to analyze the possible impacts.

Figure 3:
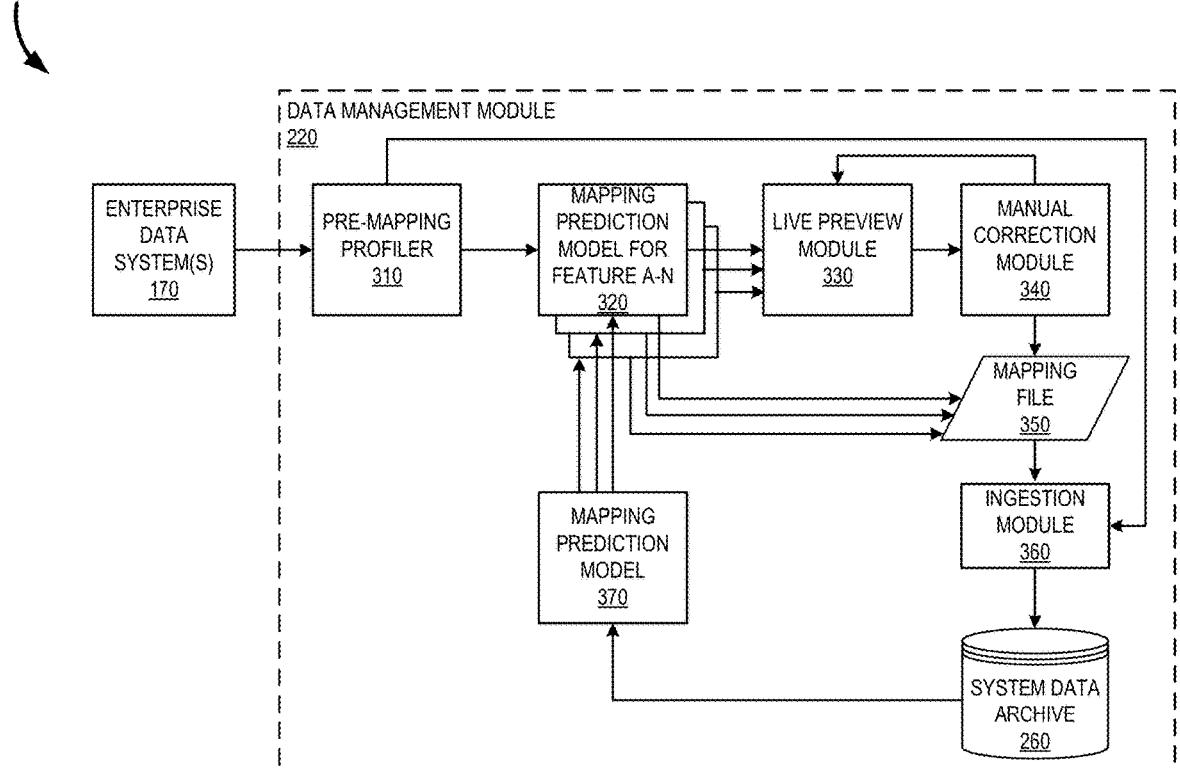
FIG. 3 is a block diagram illustrating an example of the data management module, in accordance with some embodiments.

Referring to FIG. 3, the Data Management Module 220 configures connections to data from customer enterprise data systems (EDS) and receives these data in both asynchronous processes (batch data import) and synchronous processes (ongoing/live data feeds). These data are then combined with any system data previously stored in System Data Archive 260 to create a representation of the supply chain network. This data is of four distinct types (examples are not exhaustive): Item Master Data (fixed data related to the item): code, description, price, UOM etc.; Item Parameter Data which determines how the network is currently planned. Examples are Current Safety Stock Levels, Delivery Frequency, Order Multiples; Supply Chain Variability data—Examples are product—level monthly demand history, delivery performance history or characteristics; Strategic Objective Parameters/Constraints such as Service Targets, Site sensitivity to complexity, cost of holding stock, Transport Costs etc.

In Data Management Module 220, data are transformed as needed to ensure compatibility with the computational requirements of the Orchestrated Intelligent Supply Chain Ecosystem 100. This transformation is the primary element of the data ingestion process. Initially, the enterprise data systems 170 provide raw data files to a pre-mapping profiler and harmonizer 310 in the data management module. The raw data files may take many forms, but often includes excel files, or other tabular data sets.

The pre mapping profiler and harmonizer 310 performs a number of tasks. One of the initial tasks is to disambiguate headers that are unclear. A combination of heuristic and AI/ML techniques may be employed for this disambiguation process. The profiler and harmonizer 310 may initially use keyword matches to identify known header values, and where appropriate, replace a known header to a standardized header. For example, the system may look for the terms 'item', 'item id', 'item-id', 'item_id', 'item_type', and many others. The system may, in some cases, identify all of these keywords as refereeing to the identifier for an item. The system may leverage the keyword matches to characterize the header, and in some embodiments, replace all permutations with a standardized formatted terms ("item_id" for example). The system may also leverage keyword matching to identify duplicates of headers. For example, two headers may be labeled as "description". When duplicates are found, an AI model may be employed to disambiguate the headers. The AI generally looks for three 'clues' of how to disambiguate the headers. Firstly, often a header may have a 'top' header with 'sub-headers' physically located below the top header. The top header may indicate what the sub-headers refer to. For example, a top header may state "item" and have headers below it (e.g., ID and description). Another set of columns may also have the names 'ID' and 'description', but a top header of 'node'. Thus, while the two columns may both be 'description' one is clearly a description of the item, and the other is a description of the node/site.

The AI may also disambiguate based upon data file name (e.g., a sheet for nodes may indicate the header 'description' found within it is the node description), and by data type. For example, if the header is 'description' and there are no other indicators of what it is describing, the data within these fields may be clustered against other data from known data types. The most closely aligned data then provides insight into what the "description" refers to. For example, if the data under this example 'description' heading includes Los Angeles, Antwerp, Shanghai, and Mumbai, the system may match these terms with other data sets describing locations of warehouses/nodes in the supply chain. Thus, while the header itself is not clear as to what 'description' means, the AI system can determine that it is a node description. Other disambiguation may leverage the AI's ability to perform pattern recognition between data sets (comparing the outputs of different EDS systems, such as SAP, against one another to find commonalities of formatting and outputs, and the like).

After disambiguation, the system may perform data consolidation and/or granularization if appropriate. For example, stock units may be reported on a daily basis for some clients, on a weekly basis for some clients, and on a monthly basis for other clients. When the system requires a weekly unit stock levels for the optimization process, the system may sum the daily values (or average them as appropriate) over the week period for the clients with daily reports, perform no action for clients who report on a weekly basis, and average out from the monthly reports an imputed weekly value for those clients that have data limited to a monthly cadence. When data granularization is required (which by definition must make some extrapolations/educated guesses of accurate numbers), the system may generate a notification/recommendation for the client that indicates that a more frequent reporting of the given metric would assist in more accurate optimizations. In some particular embodiments, however, it may be desirous to limit the requests/recommendations that are provided to the client, and instead the system may perform optimization analysis to determine how sensitive the optimization is to the given input. For example, maybe weekly vs monthly reporting of unit stock levels per node doesn't have a significant impact on the actual optimization results. In such cases, it may be 'good enough' to receive monthly reported levels. However, if the models are extremely sensitive to the given input, it may be desirous to flag the input granularization as a viable recommendation. In some embodiment, the sensitivity of the optimization model to a given input variable is compared against a configurable threshold, and recommendations for granularizing data are presented to the client only when the sensitivity of the given input is above the threshold.

In some cases, in addition to mere granularization/aggregation, the system may be configured to augment data directly. In these cases, the system automatically imputes values for data that are missing from incoming customer data using a variety of algorithmic, machine learning and AI methods such as regression, time series forecasting, generalized low rank models, and many others. The sensitivity of the results of the supply chain optimization to changes in imputed data is computed and reported upon, allowing the customer to focus data retrieval efforts on data that is most relevant to the final output.

Again, sensitivities to the given variable are important to characterize for feedback to the client. Such sensitivity results can be used to identify necessary improvements either to data collection methods or to the supply chain network design to achieve the most valuable improvements to the overall system. For example, if the delivery performance of a particular node has a very large impact on the Service Levels of key products, and if the delivery performance has been estimated rather than measured over time, then the system may recommend improvements to the measurement process, so that better data can be integrated into Data Importer 330. Taking the example further, if the delivery data were well measured already, then the system may suggest that steps be taken to improve the actual delivery performance of the system in order to most significantly impact the overall system performance.

After granularization/consolidation of the data is performed, a data cleaning process is performed. This process may look for clear errors in the data, such as negative numbers and outlier data. In some cases, data may be naturally diverse, with wide fluctuations. For other data types, the range in values may be less prone to fluctuations. It is possible the system is capable of identifying the data type and applying different thresholds to determine what is an 'erroneous' data point. For example, it may be the case that wildly different units are stored at different nodes. In such cases, outliers may be only identified if they are two standard deviations from the normal distribution. Lead times between two nodes, conversely (in this specific example) may vary only marginally. Thus, values only one standard deviation from normal may be considered suspect. The system may also identify when an extra digit has been added to the number (for example when reorder volumes are consistently 1000 units, and one month it states that 10000 units were ordered, this may be an indication of a typo, and when there is inconsistency in values that are related with one another. For example, if a node has X units, and the downstream node shows Y units in the following month, where Y is greater than X, the values for both X and Y may be suspect (such a situation suggests extra units have materialized from thin air).

After identifying and flagging erroneous records (and correcting them where possible), the harmonizer/profiler 310 may perform a null imputation process. Data sets generally include a number of blanks or zeros in the data. These blanks may indicate different things—they may be true zeros, they may be data from before data is present, or they may be missing data. The AI models look at data to determine what the missing value is by looking at surrounding data in the same column/series, and at data from other columns that is related to the missing data fields. For example, if unit sales are provided by month, and months January-March are blank, this may mean there were no sales in January through March (a true zero), or possibly that the item wasn't offered for sale in those months as it was a new product. The ramifications for these two scenarios are significant when the optimization is performed, so distinguishing between them is important. If for example, April through December all post quadruple digit sales, it is very likely that the missing values for January to March are erroneous, or indicate the product wasn't yet available for sale. If, however, the sales volumes were very low, and indeed zero on other months, then this may indicate that the sales were indeed zero during this period. Other clues as to the nature of a blank value may be gleaned from other data points. For example, if units on hand is a real number for the item over the dates of January to March, this is another good indication that the sales were actually just zero for these months.

The final activity that the pre-mapping profiler and harmonizer 310 undergoes is to profile/characterize the disambiguated and cleansed client data for the downstream mappings. Characterization of the data includes computing features for each column that can be used for processing the data further, either by machine learning algorithms or by manual processes. Data from the name of each file and the system it came from, the name of the column, a column description (when available) and the types and characteristics of the data values in the column are all used in data characterization. Some specific characteristics that must be determined are the type of data in the column, such as date, text, Boolean or numeric. Further, when integers are used as indententifiers (for example as a product ID or a site ID), it is necessary to determine that these are not actually numerical fields so that downstream processing can proceed correctly. Another characterization among text fields determines whether the information in the column has meaning outside the organization (for example, a country name or country abbreviation), is human readable (for example, "company main manufacturing site in Belgium"), or contains internally understandable codes that have implications for how data is to be interpreted (for example, item status codes where 0 is active, 1 is in review, 2 is samples only and 3 is end of life). Each of these characteristics has implications for how data should be interpreted and combined for processing in later steps.

Part of the characterization process may include data transforms. Incoming data may be transformed through mathematical operations to make it usable by some parts of the computation system. For example, dates of important events in the incoming data may be in a format that is not suitable for subsequent computing steps (e.g., dates in a string format) or dates may be in a variety of formats because of variations in the customer processes that generate those dates. Such data would need to be transformed and/or cleaned in this module for use in subsequent computations.

After characterization, a formula for the pre-mapping activities may be generated for future use. For example, a given client will typically provide the same data format and files to the data management module 220 every time there is an ingestion event. In order to save computational resources, the incoming data may be compared against the predefined pre-mapping formula, and generally may be processed deterministically using the 'recipe' that was previously generated. This avoids the application of the AI modeling, conserving significant computer resources.

The characterized data is then provided to a series of mapping prediction AI models 320 for each feature in the dataset. In contrast to prior systems which leverage a consolidated AI model when mapping data, the present system utilizes a plurality of AI models, each model designed to determine the mapping of a single value to a value required by the master ingest file. Basically, each input value that is required by the downstream optimization model has its own mapping model, which determines from the characterized client data which field corresponds to this input value. Each mapping model utilizes information such as historical mappings, table name matching, column and row matching, determination of which features of the table need to be filtered for in order to identify the proper value, and the like to match the optimization model input value to a field (or series of fields) in the profiled/characterized client data.

For example, assume there are 73 variables consumed by the optimization model. Let's also assume one such variable is a vector value for the inventory held at a given node. The model specific to this input variable may identify the table labeled "inventories" and then filter by item, node and therefore get the number of a given item located at each node. Individual models can include combinations of variables from different columns with complex filtering or matching requirements. For example, one column may specify how another column is to be interpreted, so that a column giving a number as a replenishment frequency might require another column that determines whether that number is in days, weeks, etc. The purpose of having multiple models, each associated with a singular optimization input variable, is to reduce overall computational resource requirements, especially when the mapping models are updated.

Upon mapping of each value, the system generates a live preview, which is displayed via the live preview model 330. The live previews include a display of one or more example values that are collected by the mapping, a pathway for the mapping, warnings about likely data errors or anomalies that result from the mapping (missing data, extreme values, ambiguous references, missing/incorrect data keys, etc.), suggestions for alternative mappings (e.g., if a different table/column has a simpler or more complete set of similar data) and other information that augments the user's ability to assess the accuracy and completeness of the mapping. A user is able to review the live previews, as they are generated by the individual mapping models, and when necessary update a particular mapping via the manual corrections module 340. The specific model 320 (and only this model from the plurality of models) may be reprocessed given the manual input, to generate an updated preview. This process is iterative until the human in the loop is satisfied with the outputs of all of the mapping prediction models 320. From this a final mapping file 350 is generated.

The mapping file 350, and the harmonization and characterization model supplied by the pre-mapping profiler 310 are all consumed by the ingestion module 360 which actually processes the raw client data from the enterprise data system 170 in order to generate a feature set that is readily digestible by the downstream optimization models. This refined dataset is stored in the system archive 260 for usage by the downstream optimization module 230 (in addition to constraints and other parameters).

In addition to generating the readable feature set, this process generates updated mapping prediction model(s) 370 and profiling models (not shown). These models are fed back to the mapping prediction models for the features 320, and the pre-mapping profiler 310, respectively, for model updating and training.

Figure 4:
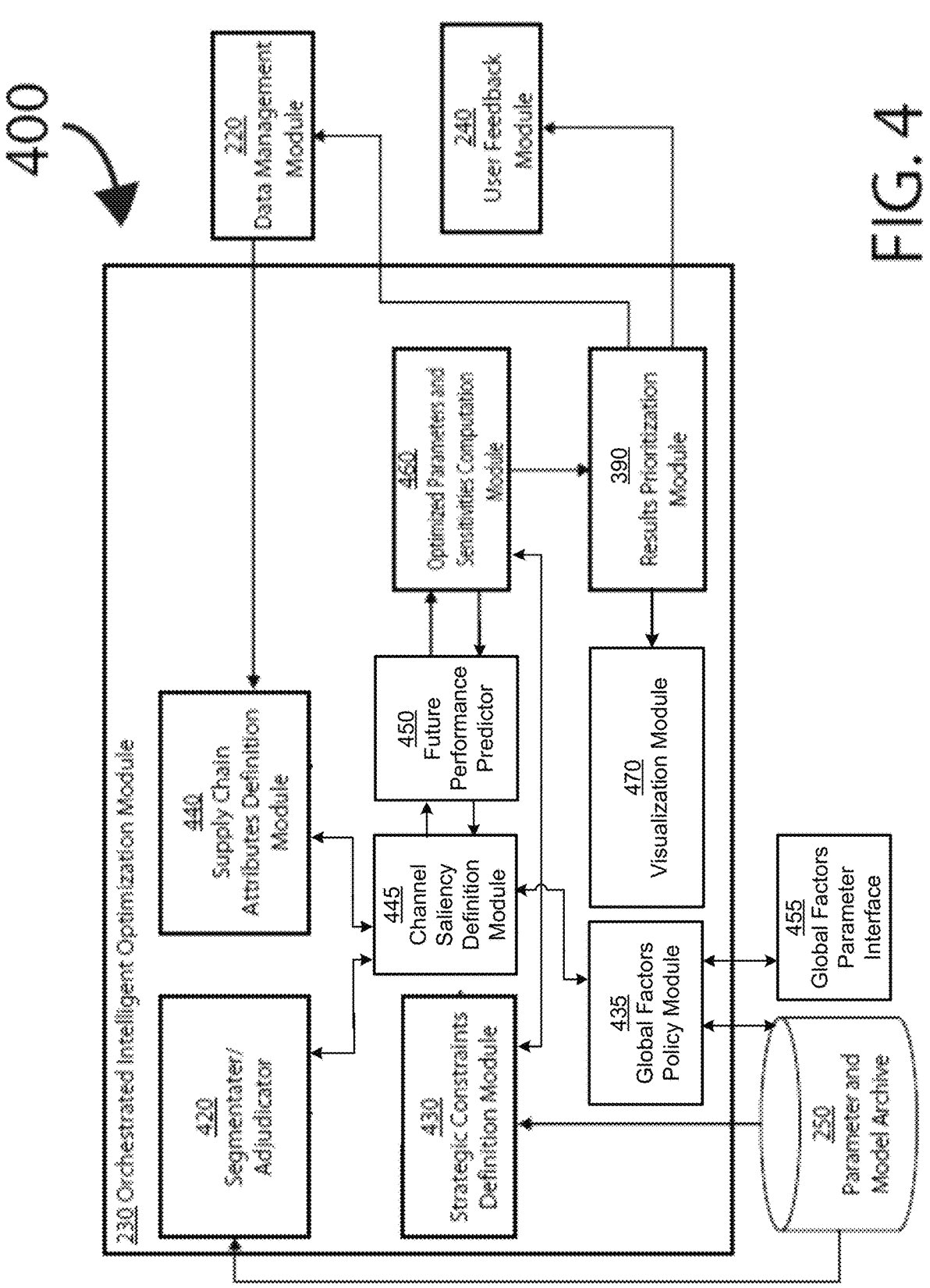
FIG. 4 is a block diagram illustrating an example of the optimization module, in accordance with some embodiments.

Turning to FIG. 4, a more detailed illustration of the optimization module 230 is provided. In a Global Factors Parameter Interface 455, external inputs to Global Factors are retrieved and made available to the Orchestrated Intelligent Supply Chain Ecosystem 100. These external inputs can include, but are not limited to, the types of carbon tax, carbon exchange trading systems and voluntary carbon offset programs that the customer is enrolled in along with parameters that determine their impacts on the customer. One important example of such parameters is cost data for carbon offsets retrieved from live systems (which may include online marketplaces, transaction exchanges, live bidding markets, or external price lists and interfaces) which can be used to compute accurate cost impacts of choices of supply chain configuration, and in some cases even execute transactions to lock in these sources at the time they are needed to offset supply chain activity.

Sensitivity results from Optimized Parameters and Sensitivities Computation Module 460 which identify sensitivity of optimization results to variability in system attributes (for example, increased probability of stockout as a result of decreased delivery performance in a specific part of the network) are presented to users of the Data Management Module 220 to inform Data Management activities. In the example given above (stockout as a function of delivery performance) this capability would identify the need to measure delivery performance more accurately, improve delivery performance in a specific part of the network, or both.

When the permissions of the logged-in users do not allow access to view or change some data in the Orchestrated Intelligent Supply Chain Ecosystem 100 appropriate selection and filtering of data may be performed in this module.

In some embodiments, the Data Management Module 220 tracks ongoing differences between the parameters that were recommended by the OI system at the time of the last parameter export and the parameters deployed in the system of record (imported through customer database). This process of creating a baseline at each export, updating supply chain characteristics such as total cost, total inventory, end-to-end supply chain throughput and lead time variability (all of which may be broken down in a number of ways including by network, subnetwork, node, region, leafSKU, productSKU, product family, among many others) and updating recommended parameters upon data export represents critical functionality for supply chain managers and organizational leaders. In some embodiments these data are represented in tabular and graphical forms in the OI user interface.

In some embodiments, the Data Management Module 220 receives availability data for supply chain resources that may include supplies, materials and other items used in the manufacturing, packaging and shipping of goods. These data may include time series of expected delivery dates and amounts of such resources or may indicate maximum average amounts of material available during different time periods. A key impact of such data is to constrain activities in the supply chain that consume these resources. For example, if the packaging of a product requires a certain size box and only 10,000 boxes are available within a certain time period, then no more than 10,000 of the product can be packages using these boxes during that period. (any input to the system at any level in the supply chain)

In Optimization Module 230, the primary optimization and analysis functions of the Orchestrated Intelligent Supply Chain Optimizer 150 are executed. This module receives data from the Data Management Module 220 and from 250 Parameter and Model Archive. It also interacts with the user to input/update strategic objective parameters and constraints that are used to inform the tradeoffs and cost function used in the optimization process.

While Item Master, Item Parameter and Variability data is set and unchanging based on imports (using the most up to date information in 220) Strategic Objective Parameters/ Constraints are defined by the user as a driver of the way the optimization process works influencing sensitivity of the model to particular goals and constraints and enabling a level of interactive-ness in the modelling process.

Several analytical processes are performed in Optimization Module 230, including segmentation of products based on most recent available data and adjudication of updated segmentation with previous segmentation results, determination of current supply chain network (which in some embodiments includes use of machine learning and AI models to recommend improvements upon an existing network and facilitate implementation of these improvements, a.k.a. AI-augmented network design optimization), prediction of future performance of the supply chain network for different supply chain parameter settings based on a variety of supply chain network configuration assumptions, analysis of optimal supply chain parameter settings given both strategic objectives (e.g. desired Service Levels (SL) for individual products or groups of products) and system-level constraints (e.g. upper limits of the number of orders a supply site can service per time period), and optimization of the presentation of results to planners and other users (in some embodiments, machine learning and/or AI models are used to recommend contents and display parameters of supply chain optimization results).

Optimization Module 230 records results of the various computations (AI-augmented network design optimization) along with user parameter selections and other computational results (e.g., cost and performance implications of choosing non-optimal parameters) in 250 Parameter and Model Archive.

Optimization Module 230 presents the optimized results to users in the User Feedback Module 240 where users (e.g., planners) interact with these results, and the results of such interactions are then transmitted back to the Optimization Module 230 as part of the Machine Learning process driving further optimization of the ML and AI models used by the module. The data is archived so that past decisions can be restored.

User Feedback Module 240 receives results from the Optimization Module 230 that have been conditioned for optimal usefulness and impact. The user may interact with these results in a number of ways, including but not limited to accepting the recommended parameters, modifying the recommended parameters, rejecting the recommended parameters, commenting on results, initiating requests and actions based on the results (for example, a request to modify a network or system constraint, or change a Service Level value for one or more products or segments) and submitting and/or exporting results to the planning system for implementation. Feedback, responses, comments, requests and other input from users are sent back to the Optimization Module 230 for further processing. In some embodiments, feedback, responses, requests and other input from users are sent to other customer systems outside the Orchestrated Intelligent Supply Chain Optimizer 150 as well.

The Parameter and Model Archive 250 acts as a system for storage and retrieval of information relating to the optimization and feedback process, including but not limited to: information relating to past and current model parameters, model designs, user inputs, system settings, supply chain network optimizations, recommendations and changes, intermediate computational results, computed implications of user decisions and inputs, and in some embodiments external inputs to the network design process generated by machine learning and AI systems operating on data external to the system (e.g. financial projections, news articles about markets, companies and products, social media, etc.). This archive acts as a system of record for which parameters values were recommended by the Orchestrated Intelligent Supply Chain Optimizer 150 and which values were actually put into operation by planners. As such it enables the Orchestrated Intelligent Supply Chain Optimizer 150 to both model the optimal supply chain configuration but to also monitor compliance with the recommendations to flag where failure to comply resulted in costs/issues. It also enables utilization of past results versus actuals as a means to facilitate the self-learning aspect of the ML model such that future configurations improve as the model gains more insight on what decisions drive the best outcomes.

FIG. 4 further illustrates the functionality of Orchestrated Intelligent Optimization Module 230 in greater detail. The primary function of the Segmenter/Adjudicator 420 is to apply grouping logic to products in order to facilitate the supply chain optimization process. In some embodiments, this may be an auto-segmenter that allows the data to automatically identify and suggest a segmentation scheme for the products in the supply chain. There can be multiple simultaneous segmentations or groupings in use at any time, which may have a variety of purposes. For example, products might be organized into classes based on two parameters: their financial value to the organization (e.g., annual revenue) and the variability of demand for the product (e.g. coefficient of variance or CoV). Products in different classes may be managed under different strategies, each of which implies different choices for supply chain parameters and stock ordering methodology (e.g., make-to-stock or make-to-order). These choices then directly influence the prediction and optimization strategies employed in Orchestrated Intelligent Supply Chain Optimizer 150. Another example of segmentation that could impact optimization results is a product type, for example drugs for oncology, HIV and hepatitis might be grouped together into three classes according to their intended uses. In some embodiments, such groupings might directly determine minimum Service Level values for products in each group. Because multiple segmentation or grouping mappings may be used simultaneously, there is also envisioned additional algorithmic structure that can harmonize among different groupings to ensure that ultimately product segmentation or grouping assignments are unique, thus ensuring that parameter assignments are also unique.

In some embodiments, the Segmenter/Adjudicator 420 module might assign groupings following a variety of methodologies. For example, in some embodiments, segmentation may be determined by the customer and passed directly to the system as a product-level attribute or as a mapping or other algorithmic formulation. In other embodiments, segmentation might be computed from data available to the system (product attributes from Data Management Module 220, for example, or information inferred from structured and unstructured sources outside of the customer system, such as text from web sites, healthcare documents, competitive or market analysis reports, or social media). In some embodiments, machine learning and AI may be used to directly construct useful segmentation strategies (for example using clustering algorithms or dimensionality reduction algorithms such as Latent Dirichlet Allocation).

The segmentation activities performed in Segmenter/Adjudicator 420 may be performed periodically (timing could be ad hoc or on a specific cadence, and timing could depend on the specific segmentation algorithm being applied) to ensure that segmentation or grouping of each product is still appropriate to the current conditions. For example, if segmentation depends upon product CoV and the measured product CoV has changed for any reason over time, then it is important for the system to detect this situation and alert the customer.

This is where the Adjudication function of Segmenter/Adjudicator 420 is performed. At any time, an appropriately permissioned user of the system might override the recommended segmentation or grouping of a specific product and set parameters manually. Additionally, when the assigned segmentation or grouping of a product changes over time, such a user may choose to accept or override the newly computed grouping. Adjudication allows users to visualize segmentation or grouping assignments and to assign new values as underlying data or corporate strategies evolve.

An important role of the Channel Saliency Definition Module is to assign relative importance, priority or weighting values ("Channel Saliency Values") to specific products for specific channels (a channel may be an end customer, consumer or category or grouping of customers or consumers). Channel Saliency Values are used in the optimization process (Orchestrated Intelligent Optimization Module 230) to allocate inventory or product supply to channels in an automated, intelligent manner when product supplies are constrained, as when there is a limitation on availability of one or more supply chain resources. An important example is the allocation of vaccines when the number of individuals in a region exceeds the number of vaccine doses that are available to serve that region. In this case, public health policies such as prioritizing vaccines for older individuals, or for those with specific comorbidities or vulnerabilities, are cast in terms of Channel Saliency Values (patients with age over 80 would have higher values than younger patients, for example) and the optimization is carried out to ensure that the most optimal method of achieving the public health policy objectives for the vaccine program would be carried out.

The Strategic Parameters and Constraints Definition Module 430 module allows the user to identify constraints on allowed supply chain configurations to ensure compliance with both physical limitations of systems and corporate governance and strategy. For example, without constraints, the Optimized Parameters and Sensitivities Computation Module 460 module might find optimal supply chain parameters settings for products individually, without any regard for the system-wide implications of such settings. As a specific example of this, individual product-level optimization may imply a very large number of frequent reorders of a group of products that are being manufactured by a specific supply site. It may not be physically possible or financially feasible for this supply site to service such a large number of reorder requests (which generally imply reconfiguring the actual manufacturing systems among many other effects), so a constraint limiting the total number of orders to a supply site would need to be included in the computations carried out by the Optimized Parameters and Sensitivities Computation Module 460. Other examples are high transportation costs on particular Supply Customer routings, Pallet spacing in a warehouse and the impact of bulky items on such a modelling outcome.

Other strategic constraints might express business imperatives, such as reducing overall inventory in parts of the supply chain or ensuring that the risk of a stockout of a critical product or group of products be below a specific level.

In many cases, supply constraints can impact many different supply chains simultaneously, creating a need to define global strategic parameters that govern the optimization of multiple products simultaneously in Strategic Parameters and Constraints Definition Module 430. These global strategic parameters are used to regulate the application of Channel Saliency values to define the optimal allocation of products across different coupled markets and supply chains.

The Global Factors Policy Module 435 allows the user to configure the inputs, computations, and outputs required to satisfy the user's Global Factors Policy. Global Factors refer to all impacts of the supply chain that are not directly part of traditional supply chain costing and logistics activities. Global Factors can have both internal (internal to customer) and external impacts. An example of a Global Factor is environmental impact of the operations defined within the supply chain, and a specific example of an environmental impact could be carbon emissions footprint. For the example of a carbon emissions footprint, different supply chain configurations and choices can have environmental and cost implications. Specifically, the Orchestrated Intelligent Supply Chain Ecosystem 100 can compute the explicit costs of land and air transportation, the implied costs of these choices induced by differences in delivery time, inventory holding requirements and delivery time variability and also the different carbon emissions costs induced by these choices. Carrying the example further, depending upon whether the customer is subject to carbon taxes, requirements for carbon offsets or even voluntary carbon offsets, the costs of these factors can be included in the computation of costs implied by each supply chain configuration decision.

The Global Factors Policy Module 435 considers at least three areas of factor for the inclusion of Global Factors in supply chain optimization: Explicit sources of Global Factors costs, the ultimate disposition and publication of Global Factors results and the strategic objectives and preferences of the customer in the computation of Global Factors. The first of these, explicit sources of Global Factors costs, includes information on what kinds of Global Factors costs the organization is subject to (for example, carbon taxes, environmental offsets and/or credits, compliance offsets, voluntary offsets, etc.) and what the specific costs for these factors are. These inputs are imported by Global Factors Parameter Interface 255, including in some cases real time information pertaining to live market costs of carbon offsets or other commodities. The ultimate disposition and publication of Global factors pertains to internal and external reporting and display of Global Factors results. Outputs in this category include, but are not limited to, internal dashboards and reports of costs, tradeoffs and impacts of supply chain optimization activities, external reporting for regulatory compliance or for public communication and interaction with live interfaces, including transactional markets for environmental offsets (where bids might be published for the required offset commodities and actual purchase and sale transactions of these commodities might be carried out). Strategic objectives and preferences for the organization pertaining to Global Factors could include many factors that impact how the costs are computed and how tradeoffs are valued, such as which types and sources of offset commodities might be acceptable or preferred for purchase, how much "effective cost" for Global Factors should be taken into account (for example is an offset cost of $1000 equivalent to a "hard cost" of $1000 to transport materials from one location to another), and what publication, reporting, dashboard and tracking activities should take place within the organization. Taken together, these three categories of input parameters determine the cost and tradeoff structure that drives optimizations of a supply chain in a way that includes Global Factors.

The Supply Chain Attributes Definition Module 440 objective is to characterize the physical and performance characteristics of the relevant parts of a supply chain quantitatively. The definition of "relevant parts" of a supply chain in this context is any physical or logical aspect of a supply chain that materially influences the selection or computation of optimal supply chain operating parameters. For example, while a customer's supply chain globally may include supply chain networks in North America and Europe, it may be the case that these supply chains are entirely decoupled and do not influence each other's behavior. In this case then, the "relevant parts" of the supply chain in the optimization of product delivery to Spain would include the European supply chain but not the North American supply chain. This is not to imply that relevancy is only determined by geographical factors. As another example, it may be that the performance of a leaf node of a supply chain can be completely characterized by the delivery performance of a single node upstream along with total transportation costs to the leaf node and manufacturing costs for the product. In this case, it may be quantitatively acceptable to ignore supply chain network nodes between the manufacturer and the first node upstream from the leaf node, effectively rendering those intermediate nodes as not "relevant parts" of the network for the purpose of optimizing the leaf node operating parameters. This is an important point, because it is a unique characteristic of the present invention that complete knowledge of all supply chain attributes in a customer's entire supply chain is not required to arrive at quantitatively and qualitatively optimal parameters.

In some embodiments, the Supply Chain Attributes Definition Module 440 can operate in several modes. In the first mode ("fixed network mode"), the physical attributes of the supply chain network upstream of leaf nodes are assumed to be fixed. This means that the locations and roles of different nodes in the supply chain are not considered to be free parameters of the optimization process. The actual outputs and behavior of each node may be highly variable, but the presence, role and operational characteristics of each node may not be changed by a user in this mode. To be specific, in this mode, the optimization process carried out by Orchestrated Intelligent Optimization Module 230 optimizes leaf node supply chain operational parameters such as reorder strategy, reorder frequency, safety stock level and others, subject to system-level constraints such as total orders serviced by each supply site per year. This is an optimization of certain parameters, holding the overall structure of the network fixed (although again, the actual outputs of this fixed system can be highly variable and may be modeled algorithmically by the system).

In another mode, the "fixed network end-to-end optimization mode", the locations and roles of supply chain network nodes upstream from leaf nodes are considered to be fixed, but some of their operational parameters may be optimized subject to system-level constraints. In this mode, the amount of inventory to be held, the reorder frequency and strategy of the node and the allocation rules for supplying downstream nodes are examples of parameters that might be optimized by the Orchestrated Intelligent Supply Chain Ecosystem 100.

In yet another mode, the actual locations and roles of nodes across the entire supply chain may be optimized by the Orchestrated Intelligent Supply Chain Optimizer 150 ("full end-to-end network optimization mode"). In this mode, the actual opening, closing and modification of physical facilities may be contemplated as part of the optimization. For example, it may be more efficient to open a new upstream supply warehouse to service multiple complex products than to place increased demands on an existing warehouse that has reached operational capacity.

In some embodiments, users may suggest or test certain optimizations, in other options for optimization may be suggested entirely by algorithmic means (for example using machine learning or AI), and in others a combination of both user input and algorithmic suggestions may be employed, resulting in a system that can flexibly identify optimal supply chain configurations for different customer situations.

The consequential output of Supply Chain Attributes Definition Module 440 is a sufficient characterization of the quantitative aspects of the supply chain to allow the Orchestrated Intelligent Supply Chain Optimizer 150 to carry out the computations defined in Future Performance Predictor 450.

Future Performance Predictor 450 is a cornerstone of the Orchestrated Intelligent Optimization Module 230 in which future performance of the supply chain for each fixed set of operational parameters is predicted for the supply chain defined in Supply Chain Attributes Definition Module 440. In this module, each fixed set of operational parameters can be viewed as in input feature vector to the prediction module, and the predicted performances for all input feature vectors are then both archived and passed to Optimized Parameters and Sensitivities Computation Module 460 in order to perform constrained optimization on the entire system and to arrive at recommended operational parameters.

A variety of methods can be used to determine the complete set of input feature vectors to be used in Future Performance Predictor 450. For example, a fixed grid of parameter values (for example, reorder frequency, safety stock and upstream delivery performance variability) might be created and future predictions for all of these input feature vectors computed.

In some embodiments, an adaptive approach to input feature vector selection might be used to improve computational performance. For example, input feature vectors could be selected to follow along contours of fixed Service Level, or a gradient-based search algorithm could be employed to rapidly identify input feature vectors near local optima. Many different algorithmic approaches might be employed in this phase to build up a representation of the system behavior.

Given an input feature vector for the supply chain, the predicted future behavior may be determined by a variety of algorithmic methods. For example, one might train an AI system to predict future performance based on the input feature vector and supply chain network attributes. Alternatively, one might use a statistical approach to compute probabilities of different outcomes, such as a stockout or a reorder. Additionally, one might use a simulation approach to generate an ensemble of different future behaviors and then compute estimates and confidence levels of future outcomes based upon these ensembles. It is envisioned that a variety of algorithmic techniques may applied in this phase to predict the implications of different parameter selections. For example, a formal sensitivity analysis can be performed so that an estimate of the future outcome can be broken down into its constituent uncertainties and ranked so that the customer can be warned of the items that are the most pressing.

A critical component of the Future Performance Predictor 450 process is to forecast future product demand. In some embodiments, modeling and forecasting of product demand is performed entirely within this module and using algorithmic methods developed and/or implemented within the Orchestrated Intelligent Supply Chain Optimizer 150. In other embodiments, forecast sales values and or algorithmic formulations of product sales forecasts may be incorporated and used alongside internal forecast methodologies. Such an approach allows external business knowledge of future sales events (for example, promotional events, government drug purchase tenders, new product introductions, or expiration of a drug patent) to be incorporated into the prediction process, but not at the expense of advanced analytical prediction methods that have been developed internal to Orchestrated Intelligent Supply Chain Ecosystem 100.

The function of Optimized Parameters and Sensitivities Computation Module 460 is to identify optimal supply chain parameters based on the system performance predictions computed in Future Performance Predictor 450. The AI modelling algorithm seeks to identify based on the input parameters both imported and computational the optimal configuration response to meet targeted parameter constraints with the current and predicted levels of variability as identified in the input data. The models seek the optimal balance between service and target for that part of the supply chain selected for the computation. An additional function of Optimized Parameters and Sensitivities Computation Module 460 is to compute the relative sensitivities of recommended parameters to underlying variables. Each of these will be described below.

To identify optimal supply chain parameters, this module searches the space of all possible input feature vectors (the operational parameters of the supply chain that are desired to be optimized, such as reorder frequency and safety stock level for each product) and identifies an optimal set of such parameters, subject to the system-level constraints defined in Strategic Parameters and Constraints Definition Module 430.

In some embodiments, this process may be carried out in an iterative fashion in conjunction with Future Performance Predictor 450. There is a tradeoff between the granularity and completeness of the coverage of input feature vectors in Future Performance Predictor 450, which can generate a large amount of data and consume significant compute time, and the speed of the optimization and analysis process. The Orchestrated Intelligent Optimization Module 230 is designed to exploit these tradeoffs to provide maximal flexibility, accuracy and performance (including user experience) during the identification of optimal supply chain operational parameters.

In some embodiments, Future Performance Predictor 450 will include cost and impact computations that incorporate Global Factors such as environmental impact, cost of regulatory and voluntary offsets of such impacts, and other computed factors that might influence supply chain optimization. Some of these computations incorporate external costs of offset commodities and/or tax rates, which may be modeled within this module, or received as inputs to this module through inputs to the system from Global Factors Parameter Interface 255. In some embodiments, these inputs may be retrieved from live marketplaces in which offset and other Global Factor commodities are priced and traded in real time, and actual purchase/sale transactions of such commodities may be triggered (and/or executed) as part of the optimization computation (for example in order to ensure that the actual cost of the supply chain is consistent with the optimization computation).

The process to compute sensitivities of recommended supply chain operational parameters to underlying factors is carried out by comparing the predicted performance of the supply chain for input feature vectors near the recommended optimal parameters. By creating an internal model of the behavior of the system in the neighborhood of each recommended optimal parameters, the Optimized Parameters and Sensitivities Computation Module 460 can identify which factors are most likely to significantly alter the results of the analysis if they were to change, or if they were to be more accurately characterized in the data coming into the system at Data Management Module 220. Such results are presented to users at Data Management Module 220 and/or User Feedback Module 240, depending upon the permissions and characteristics of each user. In some embodiments, results from this analysis might be communicated to customer outside of the Orchestrated Intelligent Supply Chain Optimizer 150.

For example, the average inventory required to maintain a high Service Level for a product might be very sensitive to the Service Level, making it prudent to investigate whether such a high Service Level is indeed appropriate for the product. In another example, the sensitivity analysis may identify a modeled delivery performance that has a very large impact on underlying product availability performance. In such a case, the availability of this information to users allows the customer to make an informed decision about the value of investing resources to either more carefully characterize the delivery performance, or to actually take steps to improve the reliability of that delivery system. In either case, access to such sensitivity information is highly valuable to the customer in determining how to allocate assets and effort in the service of improving the overall performance of the stakeholder's respective supply chain.

A Results Prioritization Module (not illustrated) performs an analysis of all of the recommended parameter settings based on the optimization in Optimized Parameters and Sensitivities Computation Module 460 and then computes importance factors that determine how the results are displayed to the user. In some cases, all of the results might be presented in a single table, sorted in an order selected by the user. However, in many cases, because the number of products can be very large, it is critical to use analytical techniques to prioritize results and optimize the presentation of these results.

This is especially important given the fact that users have the option to use recommended optimal supply chain parameter values, or to override them. This means that after each analysis, there can be parameters that are far from their optimal values, and which subsequently can represent significant risk for the customer.

Hence, Results Prioritization Module applies analytical techniques (machine learning and AI in some embodiments) to determine which recommendations are most important to act on, for example because they mitigate risk or have large revenue implications. While this invention is applicable to supply chains in any industry or product area, as an example, consider an HIV product for which there are significant health implications if a stockout occurs. Because of changes in demand variability, or because of previously suboptimal manually set supply chain parameters, such a product might represent a significant risk to patients and the customer. Such a product would be assigned high priority in this module so that appropriate action could be taken by a user.

In some embodiments, Results Prioritization Module may trigger purchase and/or sale transactions of commodities (for example carbon offsets) that are required to perform the optimizations imagined in Future Performance Predictor 450. Once specific optimization choices are selected, the customer may elect to "lock in" the pricing of offsets or other commodities in order to ensure that the computations are reflective of actual conditions (in other words, to avoid changes in the price that might change the optimal solution or induce increased operational costs).

These prioritized results are transmitted to either Data Management Module 220 or User Feedback Module 240, depending upon what inputs they pertain to, and which kind of user is most appropriate to act upon them. For example, an adjustment to Service Level or safety stock level might be made by a Planner, but a project to investigate delivery performance at a supply chain node might be initiated by a supply chain manager or IT director.

Additionally, the Visualization Module 470 may take the output of the Results Prioritization Module and generate specific graphical representations of the output for user consumption.

Figure 5:
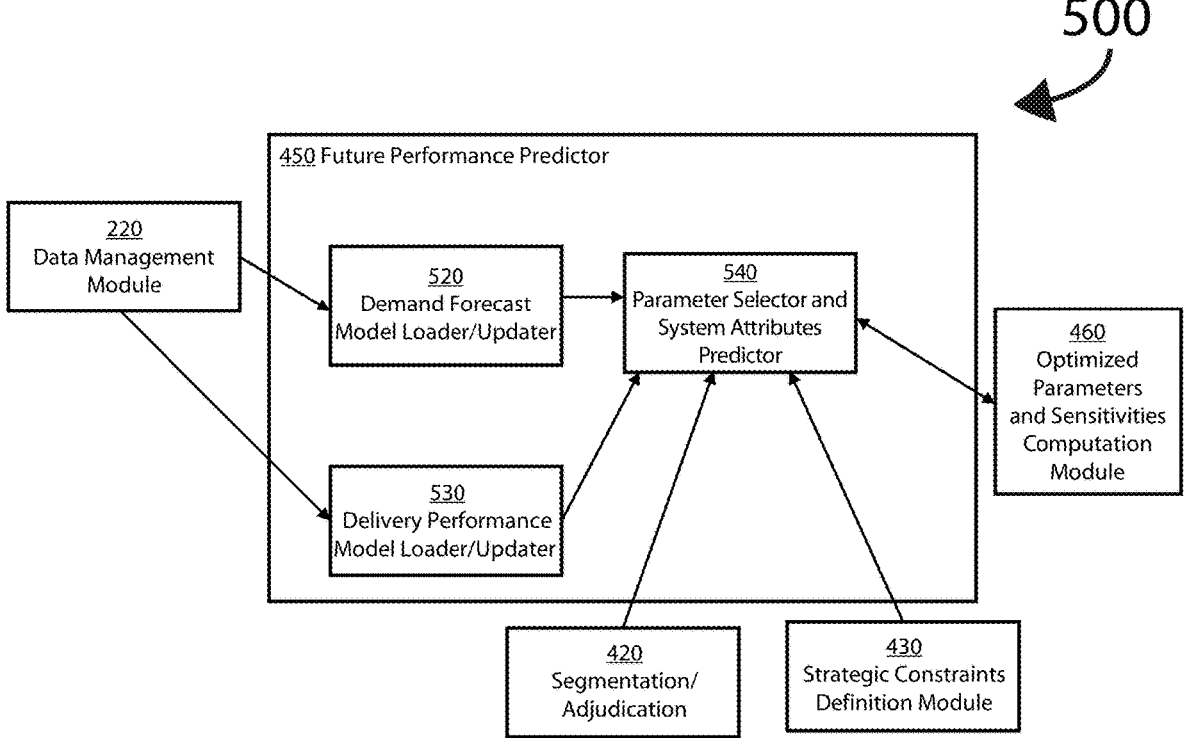
FIG. 5 is a block diagram illustrating an example of the performance prediction module, in accordance with some embodiments.

Referring now to FIG. 5, a critical component of the Future Performance Predictor 450 process is to forecast future product demand. In some embodiments, modeling and forecasting of product demand is performed entirely within this module and using algorithmic methods developed and/or implemented within the Orchestrated Intelligent Supply Chain Optimizer 150. In other embodiments, forecast sales values and or algorithmic formulations of product sales forecasts may be incorporated and used alongside internal forecast methodologies. Such an approach allows external business knowledge of future sales events (for example, promotional events, government drug purchase tenders, new product introductions, or expiration of a drug patent) to be incorporated into the prediction process, but not at the expense of advance analytical prediction methods that have been developed internal to the Orchestrated Intelligent Supply Chain Ecosystem 100.

In Demand Forecast Model Loader/Updater 520 internal modeling and forecasting assets are applied to product sales demand data from Data Management Module 220 to generate one or more product sales forecasts. In some embodiments, a customer generate forecast or forecasting model may be loaded in order to supplement the scope of future performance predictions.

In a parallel process of some embodiments, forecast and demand history time series data are updated in an ongoing monitoring process and a model representing the relationship between forecast and demand is updated. This model takes into account the likely variation between sales forecast and actual realized demand. For example, if the sales forecast is consistently higher than the actual demand, then the model will learn this. By a similar token, the model will learn the variability of actual demand relative to the single sales forecast.

This model of the relationship between sales forecast and demand history can be used to generate bias and noise terms for use in the regression calculation that generates the posterior distribution from the forecast and the prior.

Functions drawn from the posterior distribution can then be used as probability-weighted future demand scenarios in the construction of a SMSpace which can then be used in the global optimization of an end-to-end supply chain.

An important component of the Future Performance Predictor 450 process is to forecast future product delivery performance throughout the supply chain network. In some embodiments, modeling and forecasting of product delivery performance is performed entirely within this module and using algorithmic methods developed and/or implemented within the Orchestrated Intelligent Supply Chain Optimizer 150 as applied to historical delivery performance data. In other embodiments, historical delivery performance data may not be available, so supplementary information such as delivery performance models developed by the customer may be used.

In Delivery Performance Model Loader/Updater 530 internal modeling and forecasting assets are applied to historical delivery performance data from Data Management Module 220 to generate one or more estimates of future delivery performance. In some embodiments, a customer generated model or performance estimate may be loaded in order to supplement the scope of future performance predictions.

As described above, Future Performance Predictor 450 is a cornerstone of the Orchestrated Intelligent Optimization Module 230 in which future performance of the supply chain for each fixed set of operational parameters is predicted for the supply chain defined in Supply Chain Attributes Definition Module 440. In this module, each fixed set of operational parameters can be viewed as in input feature vector to the prediction module, and the predicted performances for all input feature vectors are then both archived and passed to Optimized Parameters and Sensitivities Computation Module 460 in order to perform constrained optimization on the entire system and to arrive at recommended operational parameters.

A variety of methods can be used in Parameter Selector and System Attributes Predictor 540 to determine the complete set of input feature vectors to be used in Future Performance Predictor 450. For example, a fixed grid of parameter values (for example, reorder frequency, safety stock and upstream delivery performance variability) might be created and future predictions for all of these input feature vectors computed.

In some embodiments, an adaptive approach to input feature vector selection might be used to improve computational performance. For example, input feature vectors could be selected to follow along contours of fixed Service Level, or a gradient-based search algorithm could be employed to rapidly identify input feature vectors near local optima. Many different algorithmic approaches might be employed in this phase to build up a representation of the system behavior.

Given an input feature vector for the supply chain attributes, parameters and/or configuration, the predicted future behavior may be determined by a variety of algorithmic methods. For example, one might train an AI system to predict future performance based on the input feature vector and supply chain network attributes. Alternatively, one might use a statistical approach to compute probabilities of different outcomes, such as a stockout or a reorder. Additionally, one might use a simulation approach to generate an ensemble of different future behaviors and then compute estimates and confidence levels of future outcomes based upon these ensembles. It is envisioned that a variety of algorithmic techniques may be applied in this phase to predict the implications of different parameter selections.

Figure 6:
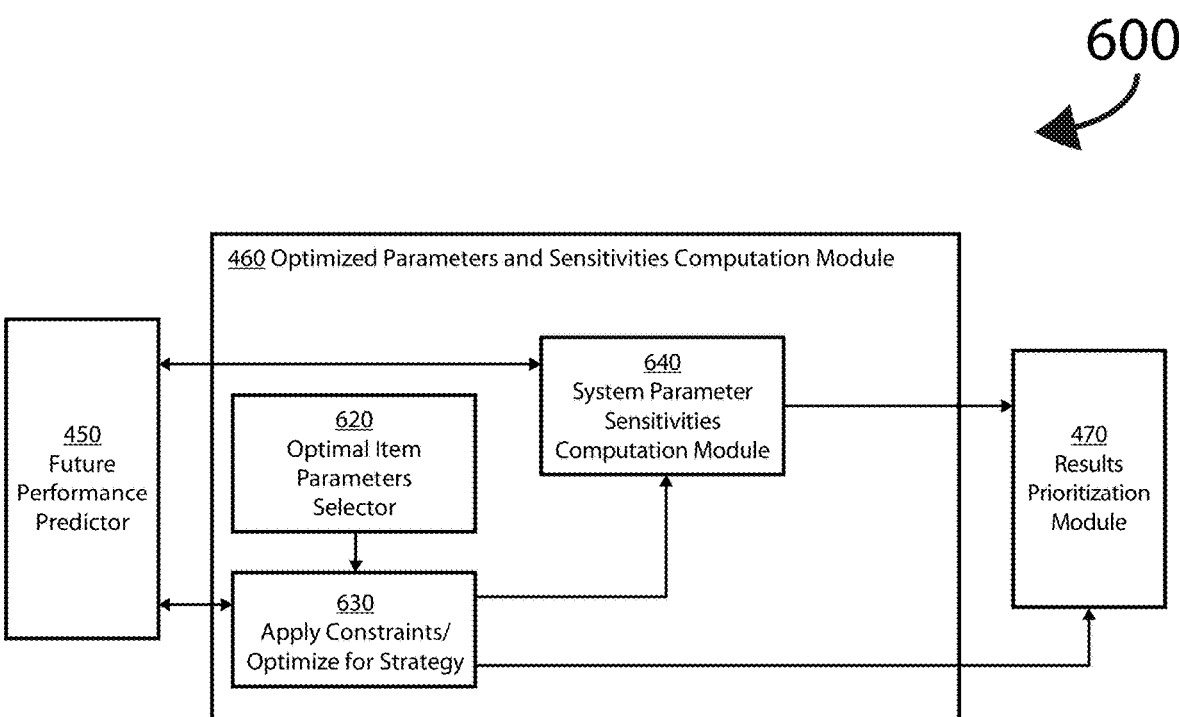
FIG. 6 is a block diagram illustrating an example of the optimized parameters and sensitivities computation module, in accordance with some embodiments.

As shown in FIG. 6, the function of Optimized Parameters and Sensitivities Computation Module 460 is to identify optimal supply chain parameters based on the system performance predictions computed in Future Performance Predictor 450. An additional function of Optimized Parameters and Sensitivities Computation Module 460 is to compute the relative sensitivities of recommended parameters to underlying variables. Each of these will be described below.

To identify optimal supply chain parameters, the Optimal Item Parameters Selector 620 searches the space of all possible input feature vectors (the operational parameters of the supply chain that are desired to be optimized, such as reorder frequency and safety stock level for each product) and identifies an optimal set of such parameters, subject to the system-level constraints defined in Strategic Parameters and Constraints Definition Module 430. In some embodiments, Optimal Item Parameters Selector 620 works with Apply Constraints/Optimize for Strategy Module 630 in an iterative fashion to navigate the space of input feature vectors in order to determine the optimal set of parameters that satisfies system level constraints.

In some embodiments, this process may be carried out in an iterative fashion in conjunction with Future Performance Predictor 450. There is a tradeoff between the granularity and completeness of the coverage of input feature vectors in Future Performance Predictor 450, which can generate a large amount of data and consume significant compute time, and the speed of the optimization and analysis process. The Orchestrated Intelligent Optimization Module 230 is designed to exploit these tradeoffs to provide maximal flexibility, accuracy and performance (including user experience) during the identification of optimal supply chain operational parameters.

To identify optimal supply chain parameters, the Optimal Item Parameters Selector 620 module searches the space of all possible input feature vectors (the operational parameters of the supply chain that are desired to be optimized, such as reorder frequency and safety stock level for each product) and identifies an optimal set of such parameters, subject to the system-level constraints defined in Strategic Parameters and Constraints Definition Module 430. In some embodiments, Optimal Item Parameters Selector 620 works with Apply Constraints/Optimize for Strategy Module 630 in an iterative fashion to navigate the space of input feature vectors in order to determine the optimal set of parameters that satisfies system level constraints.

The process to compute sensitivities of recommended supply chain operational parameters to underlying factors is carried out in System Parameter Sensitivities Computation Module 640 by comparing the predicted performance of the supply chain for input feature vectors near the recommended optimal parameters. By creating an internal model of the behavior of the system in the neighborhood of each recommended optimal parameters, the Optimized Parameters and Sensitivities Computation Module 460 can identify which factors are most likely to significantly alter the results of the analysis if they were to change, or if they were to be more accurately characterized in the data coming into the system at Data Management Module 220. Such results are presented to users at Data Management Module 220 and/or User Feedback Module 240, depending upon the permissions and characteristics of each user. In some embodiments, results from this analysis might be communicated to customer outside of the Orchestrated Intelligent Supply Chain Optimizer 150.

For example, the average inventory required to maintain a high Service Level for a product might be very sensitive to the Service Level, making it prudent to investigate whether such a high Service Level is indeed appropriate for the product. In another example, the sensitivity analysis may identify a modeled delivery performance that has a very large impact on underlying product availability performance. In such a case, the availability of this information to users allows the customer to make an informed decision about the value of investing resources to either more carefully characterize the delivery performance, or to actually take steps to improve the reliability of that delivery system. In either case, access to such sensitivity information is highly valuable to the customer in determining how to allocate assets and effort in the service of improving the overall performance of the supply chain.

When limitations on supply chain resources are in effect (for example, when insufficient raw materials are available to make enough product to satisfy predicted demand) then optimization in Optimized Parameters and Sensitivities Computation Module 460 must incorporate Channel Saliency values to determine how to allocate products to specific channels. The results of this optimization can be parameterized as traditional supply chain planning parameters (for example safety stock and reorder amount) or they can be operated as a real time product routing system, in which the system directly computes and recommends movements of materials through the supply chain in order to satisfy constantly changing constraints in availability of resources, products and materials with simultaneously changing transportation performance and channel demand levels. Supply chain environments that experience frequent disruption often require such a constrained, real-time channel-sensitive optimization approach.

Figure 7:
FIG. 7 is a flow diagrams illustrating an example process of supply chain optimization.
Figure 7:
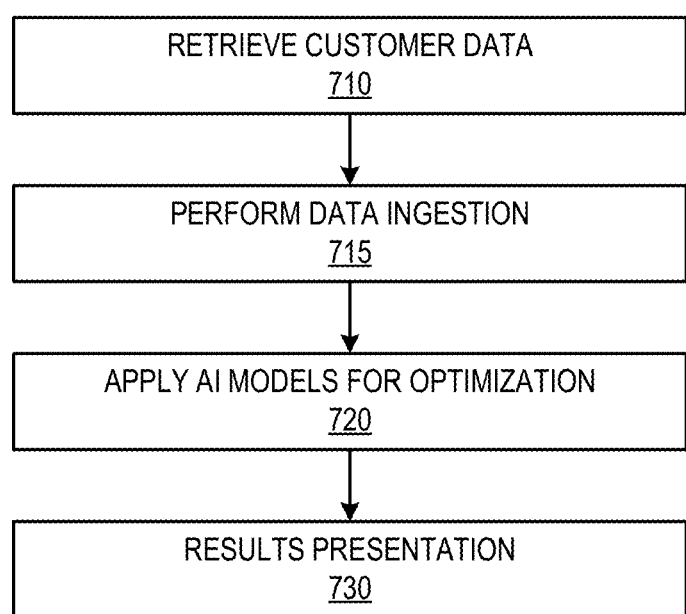

An example is in the case of pandemic disruption, where limited supply of vaccines needs to be administered, public health policy makers have to prioritize specific cohorts of patients based on ages and comorbidities and can define channels appropriately and can provide a relative prioritization. For example, A public health policy maker might define cohorts such as "Ages 50-60 and Gender is Male" or "Ages 70+ and has 2 or more comorbidities." The system constructs channels based on the above definition and the public health policy maker can assign priorities to each of the above-mentioned channels. In addition to the channel data, demographic data within specified geographic regions is also taken into account in the simulation where it generates plans based on the distribution of the cohorts within geographic regions and the priorities defined by public health policy makers FIG. 7 provides a flow diagram for an example process for the optimization of a supply chain, shown generally at 700. This process begins by the collection on raw input data from the enterprise data management system of a client (at 710). The raw data generally includes a plurality of data files. These files may take many forms, but very often include data that is stored in tabular form, generally in a series of spreadsheets. The data contained in these data files may vary between different clients, however, in general the received data typically have some commonalities. For example, items are always present. Lead times to various nodes/stages in the supply chain are also usually available. Minimum order volumes, factory changeover time, item lead time, item volumes present at each node, space within a warehouse the items consume, item requirements (keeping frozen for example), etc. Pathways from each manufacturer via multiple nodes, to the final destination is also required. Dates for all of these pieces of information are also usually provided, as the values are constantly in flux.

Generally, an optimization model requires a series of input features to properly perform an accurate optimization/supply chain performance prediction. In order to get these feature vector inputs, the client data that has been received, needs to be converted into a machine-readable format. This format requires the ingestion of the client's raw data and map it to the features consumed by the optimization model(s). This ingestion step (at 715) is not a trivial matter. It requires near real-time data input, via a remote access to the optimization system, where the data is stored. As noted, before, this client data is in non-standardized formats. The ingestion process converts the data from this non-standardized format, into a standardized format of select feature vectors. These feature vectors are stored again, and then transmitted to an optimization system (which is typically a powerful server system due to the complexity of the optimization modeling). In some embodiments, a series of virtual machine servers each undergo different tasks of the ingestion process, the optimization process, and the visualization/transmission to the client.

Whenever new client data becomes available the system may re-map the data from the non-standardized format to a standardized format and re-transmit it to the optimization system for updating the supply chain optimization. With each updated optimization, results, recommendations for supply chain changes and suggestions for data collection, are also transmitted to the remote client systems.

Figure 8:
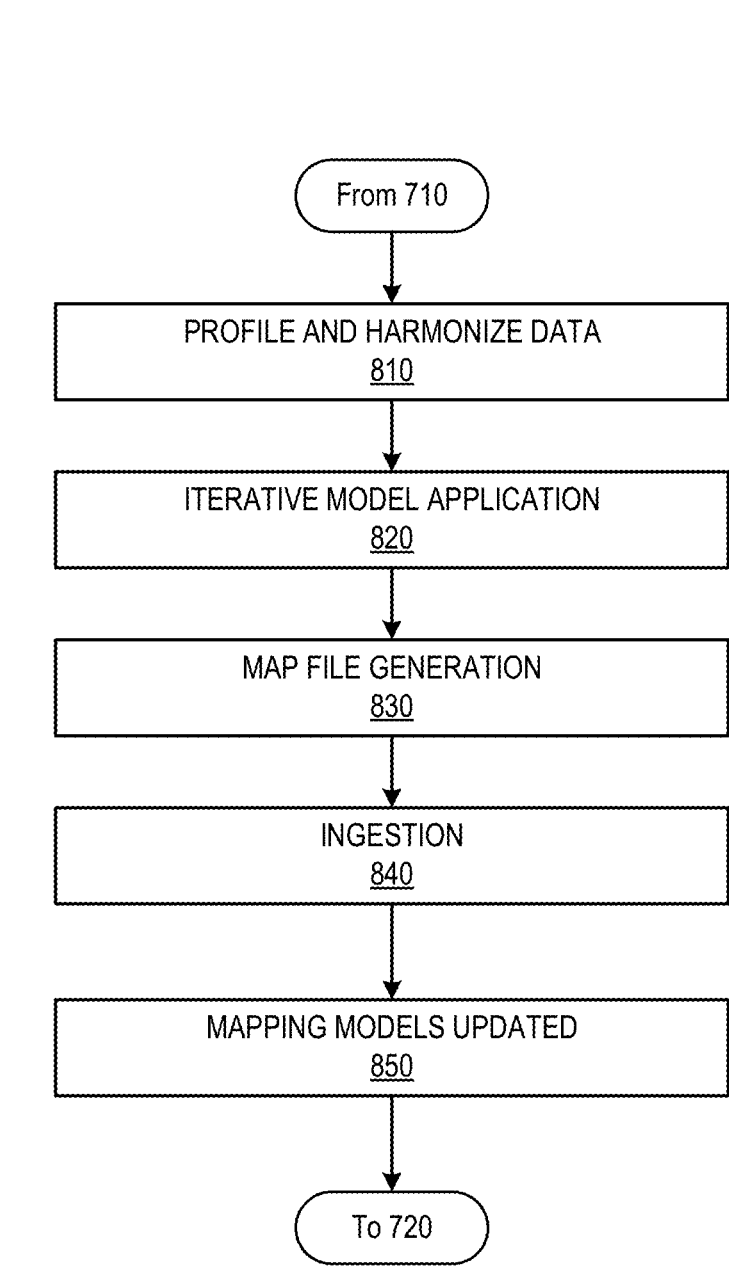
FIG. 8 is a flow diagrams illustrating an example sub-process of data ingestion.
Figure 9:
FIG. 9 is a flow diagrams illustrating an example sub-process of data profiling and harmonization.
Figure 9:
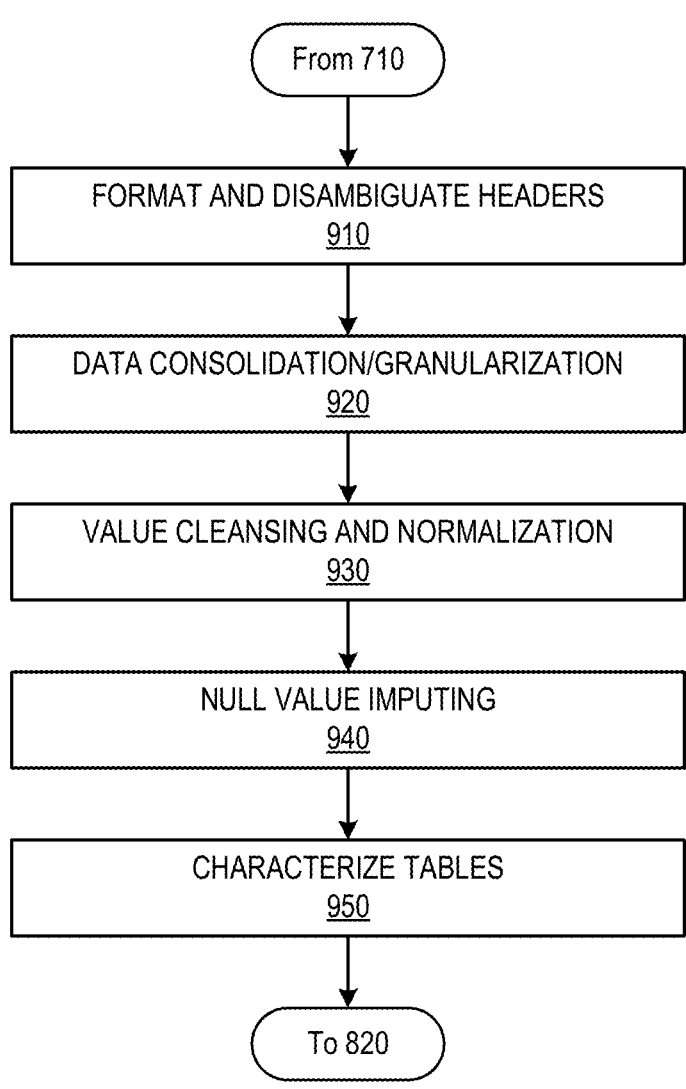

FIG. 8 provides more detail regarding the ingesting process. Initially, the data is profiled and harmonized (at 810). This profiling and harmonization is presented in greater detail in relation to FIG. 9. An initial step for the harmonization is to format and disambiguate the headers of the raw data (at 910). As noted before, the raw data usually is received as a set of tables or spreadsheets. The columns of the spreadsheets typically include descriptors that indicate what the values in each of the rows for that column are. For example, the name "item" typically indicates that the column includes an item identifier (or occasionally an item description or name). The disambiguation of headers includes keyword searching and conceptual clustering to standardize the headers (when possible). This would include changing "item" for example into "item_id" (the standardized name for this data type). A check is also made to determine if such a renaming is appropriate. For example, the harmonization model recognizes that item IDs are generally alphanumeric strings (e.g., 123456). If the column instead includes data such as "cola, 12-oz, 24 pack", the system may determine that the designation "item" does not refer to an item ID. It may then re-run the clustering algorithm subject to the constraint that the cluster must preclude item ID from the results. In this example, the clustering algorithm may then cluster the word "item" with "item_description". After a check of the column content to the expected values for this category, the system may determine that the heading is now properly disambiguated.

In some situations, the system may be unable to determine the header type based upon such keyword clustering algorithms. For example, two hearers within the same spreadsheet may have the term "description". Or a sheet may state "description" without any indicators of what this description is of. In such situations, the system may attempt a three-pronged approach to disambiguate the column header. Firstly, when there are duplicate header names, the system may look for physically adjacent words that provide context to the header. For example, a word 'site' above the header description may suggest that the term 'description' actually means "node_description". Likewise, if the term to the left were "site id", and for each different "site id" value there is a different value for each "description" then the system could reasonably determine that the term "description" is a "node_description". Again, after any attempted disambiguation, the system may 'check' the assumption by comparing the values in the column against expected values for that header type.

If physically proximate header disambiguation is not possible, or fails, the system may compare the name of the spreadsheet to the header. For example, if the spreadsheet is labeled "master-item.xlsx" and the header is simply labeled as "description", the system may identify this header as the item description. Again, a check against prototypical values for such a header type may be performed to validate that the disambiguation was accurate.

If each of these methods of disambiguation fail, the system may have to resort to clustering the values in the column against other known values. For example, if the column includes the terms Madrid, Bangkok, and Dallas, the system may utilize a conceptual lexicographic chart to relate these terms to "cities". This conceptual category is labeled as "node_description" and "manufacturing_location". The system may then compare the header (in this example it is labeled "warehouse") to the identified possible headers, and determines via clustering algorithms that the correct label for the header is 'node_description'. This process generally can disambiguate the vast majority of headers—however, due to its computational intensity, is typically reserved for situations where other, less computationally demanding, techniques have been exhausted.

Lastly, in some embodiments, a more complex pattern recognition AI model may be employed to disambiguate the headers. These ML models tend to also be computationally intensive, but generally provide very accurate disambiguation results. These AI/ML models also generally provide confidence intervals for their disambiguation. If all these techniques of determining the header fail, or the confidence is below a configured threshold, then the header may be flagged for downstream human review.

After header disambiguation, the system undertakes a process of data imputation (at 920), which includes data consolidation and aggregation wherever appropriate. As discussed previously, the degree of granularity that data is provided as from the client, does not always match the desired level of feature vector granularity for the optimization system. Thus, the data must then be aggregated, or conversely granularized, to match the ingestion requirements.

This situation most often occurs with dates/frequency of data reported, but may include other data that is provided. For example, inventory lead times may be presented as a monthly value, in some client datasets. The system, however, in some specific embodiment, may only require an average lead time for the product. In these embodiments, the system could average the provided monthly values into the required single value. Conversely, the client data may provide item volume sales on a quarterly basis, and monthly sales are required. The system can thus divide the quarterly values by three to get an average monthly sales number. A non-time/frequency example could be for unit volumes located at a particular node. The client may report this number by item lot. The supply chain optimization may not care about the lots involved, and just consume the total units located at any given warehouse. In this example, the system can aggregate/sum the lot unit numbers to get a total set of units located at each node.

In addition to granularization or aggregation, the system may also undergo other imputation processes. For example, when a value is wildly inaccurate, or is a null value. These imputations will be discussed in more detail below. However, whenever granularization of data occurs, or imputations of values, a sensitivity analysis should be performed. This sensitivity analysis includes running the optimization on the feature vectors that are collected through ingestion but varying the imputed/granularized values between different simulations. The degree/intensity of differences in the optimization output is then used to classify the degree of sensitivity that given input has upon the optimization. For values that have very low sensitivity, granularization and imputations may be deemed acceptable. However, for inputs with higher sensitivities, the client may be notified, with a suggestion that the collection of their data need improvement in these areas.

After granularization or consolidation, the system may check for data errors (at 930) for cleansing and normalization. For example, negative numbers may be eliminated from the dataset. Inconsistent numbers across various data files may be compared and corrected for (e.g., the description for item 12345 is "acetaminophen, 500 mg, 500 ct" in all data files, except one, which states "acetaminophen, 500 mg, 250 ct"—this is clearly an error in the single inconsistent data file and can be corrected for). Numbers that are significantly divergent from historical numbers (e.g., three standard deviations away from what has historically been the case) may also be corrected for. Additionally, basic transforms (such as converting all costs numbers into a common currency or converting all dates into a consistent format) may be applied. In some embodiments, basic heuristic rules may be leveraged to determine "erroneous" entries. In other instances, more complex AI models may be fed current and historical data in order to output a confidence level, and interval, that the current data is accurate. In cases where the confidence level is below a threshold, the data may be flagged as being in error. In some embodiments, this threshold may vary based upon the confidence interval (e.g., for large intervals, the confidence that the data is accurate may have a threshold that is much higher than for an instance where the interval is narrower).

After data normalization and cleansing, the system may impute values for null entries (at 940). Null entries can be zero, but more commonly are simply missing values. These null entries may be 'true' zero values, or may be the result of incomplete data, or for information where data is not yet available (e.g., sales volumes before a product launch). The system may determine if the values are accurate based upon the surrounding data (when involving a time series), or based upon historical data. For example, if in a time series, sales are triple digits for multiple months, zero for the following month, and then again in the triple digits, this clearly indicates that a value for that month is simply missing. Further, if the sales values are relatively consistent for the surrounding month, the system may impute an average sales volume for the missing value. Note, as mentioned before, a sensitivity analysis of any imputation is generally performed in order to ensure that an assumption made by the system is not grossly impacting the optimization, and when such values are more 'important' to the optimization, the client is informed that such values must be reported with greater accuracy.

The system, during null value imputation, may also identify a series of null values that extend from all recorded times up until a given time point. This suggests there is simply no values associated with the item from before this time point, and the values for the item may be omitted entirely from the optimization (as opposed to being optimized as a zero value). Other zeros or null values that are statistically possible (e.g., within two standard deviations of historic or surrounding numbers) may be included as zeros for the optimization. Lastly, when there are values that are clearly non-zero, but cannot be reasonably imputed, and have been shown to be sensitive values (important to the optimization modeling), these values may be flagged in order to request the complete dataset from the client. The goal of the ingesting process is to minimize burden upon a client, however, on rare occasion, the system simply requires additional input to generate meaningful optimization outputs.

Lastly, after null value imputation, the system may characterize the tables (at 950). This characterization process generates a "recipe" of the various heading alterations, transformations, and persistent imputations/granularization/consolidations for the given client. This recipe is then stored for later usage. The logic behind this is that the client typically utilizes consistent backend management software, and the reports and data files that are supplied to the optimization system are generally very consistent. It is computationally intensive, and labor-intensive if humans are required to review and modify data, to perform these profiling and harmonization steps, and if it is possible to merely apply a set of transformations according to a recipe, significant resources may be conserved. The system of course performs a check of the finalized data after recipe application to ensure that the process has be performed with high fidelity, as any change by the client may cause a significant disruption. However, such checking of input names and outputs is significantly easier than running the entire profiling process. Characterizing, as described above, is about identifying what type of data is in each column and how the different columns interrelate.

Figure 10:
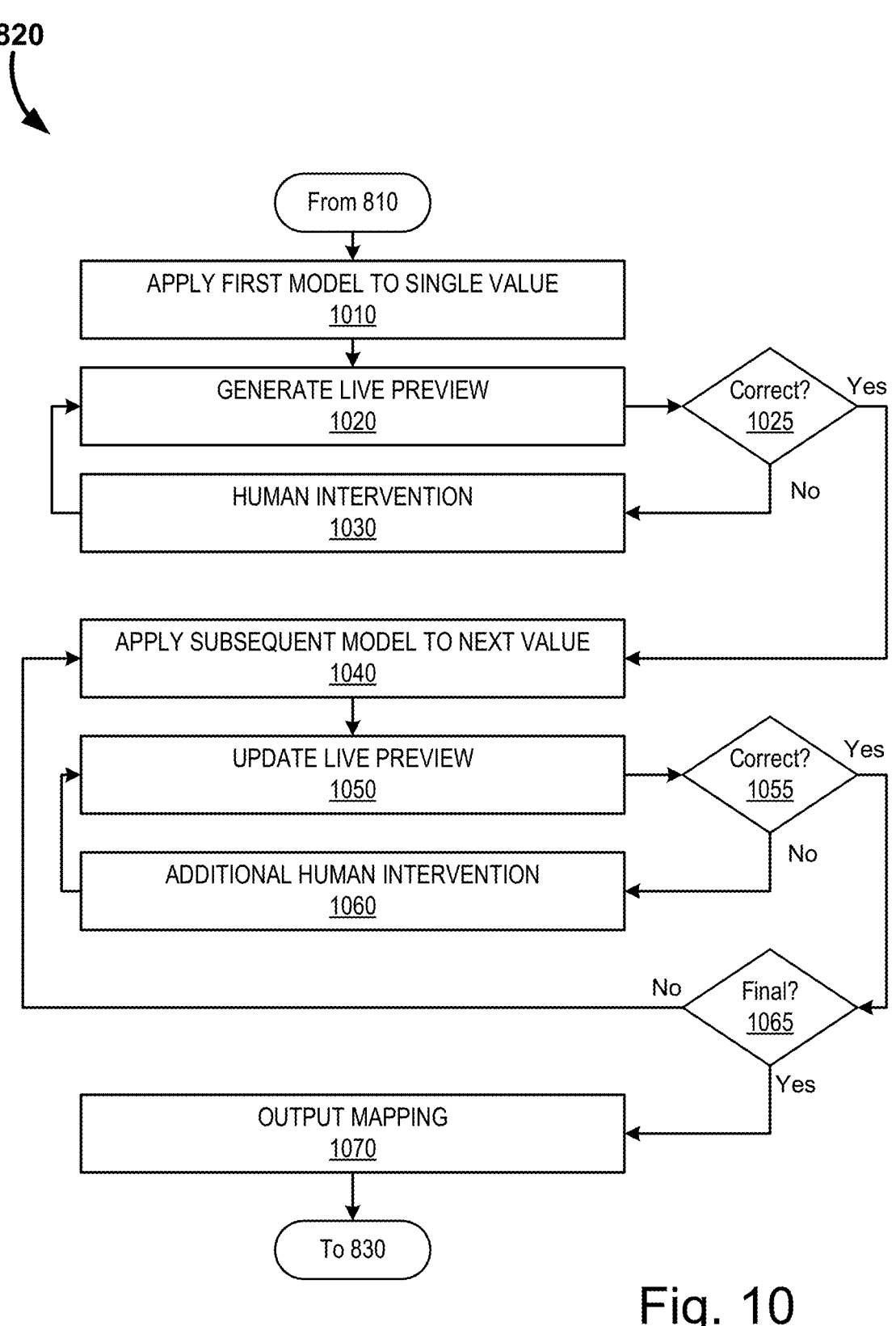
FIG. 10 is a flow diagrams illustrating an example sub-process of iterative model application.

Returning to FIG. 8, after the profiling has been completed, the system applies a series of mapping models, with each mapping model specific to a single feature that is consumed by the optimization model (at 820). FIG. 10 provides an example flow diagram for this iterative process. Initially, the first model is applied to the harmonized dataset to generate a mapping to a single feature that is consumed by the optimization model (at 1010). The optimization model looks to the various data files, and the various column headers, and matches the column data to the feature of interest. The pathway navigating the data files is generated by the model. This information is able to be used to generate a live preview (at 1020) of the dataset, including the generated pathway and randomized selected examples from the data series. This may be accepted as is based upon a model confidence level, or may be subjected to human review, to determine if the single feature model is accurate (at 1025). If not, a human may intervene (at 1030) to update the pathway, and the model may be re-run to generate the live preview again (at 1020). This iterative process may be repeated until the proper pathway for the feature has been determined. The pathway information may be saved (not illustrated) for the final mapping datafile, and for later model training.

After that first feature model has been refined, the subsequent model is applied to formulate the pathway from the client data to the subsequent feature value (at 1040). Again, a live preview is generated (at 1050), and a determination is made if it is correct (at 1055). If not, the same sort of human intervention (at 1060) and continual improvement may be made until the model has been properly defined. The system determines if additional feature models remain (at 1065), and the entire process repeats for each and every feature model. After all models have been refined/determined, the mapping file for the models is output (at 1070).

Figure 11:
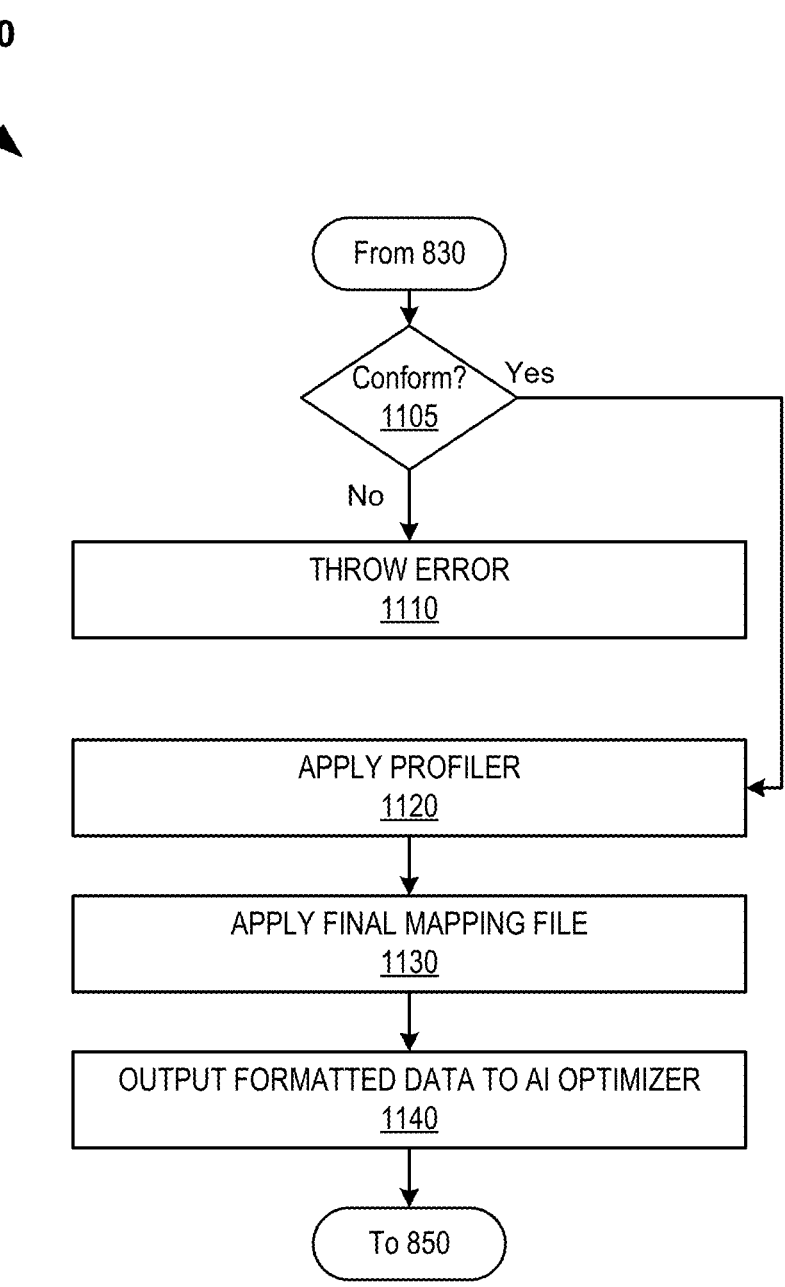
FIG. 11 is a flow diagrams illustrating an example sub-process of final ingestion.

Returning to FIG. 8, after the generation of the mapping file, the actual ingestion of the dataset (and likely future datasets with minimal changes to the chart characterization of mapping file) is performed (at 840). FIG. 11 provides a flow diagram for the example process of this ingestion step. Initially, the newly incoming raw data files from the client are compared against earlier versions that were utilized for the profiling characterization, and the mapping file generation (at 1105). If there is a substantial difference between the incoming data files, and what was used for the generation of the various recipes and models, an error results (at 1110), and the entire profiling and model application steps must be repeated. However, if there are no differences, or if the differences are minimal, the system may proceed by applying the characterization recipe of the profiler (at 1120).

Generally, another data cleansing and imputation step is performed (not shown), similar to those already discussed, is performed as these errors always vary from one ingestion to the next.

Subsequently, the final mapping file may likewise be applied (at 1130) to the profiled/harmonized data set. This generates the final machine-readable feature set that is consumed by the optimization module. The feature set is stored in the system data archive, and when ready, the formatted data is outputted to the AI optimizer (at 1140).

Returning to FIG. 8, after the ingesting process is completed (and every time it is undertaken), new data is produced regarding data mapping models and profile generation. This information may be fed back into the plurality of mapping models and the characterization models in order to train the AI system underpinning the models (at 850). This training is continuously applied, as the models are modified, in order to continually improve the ingestion process.

Figure 12:
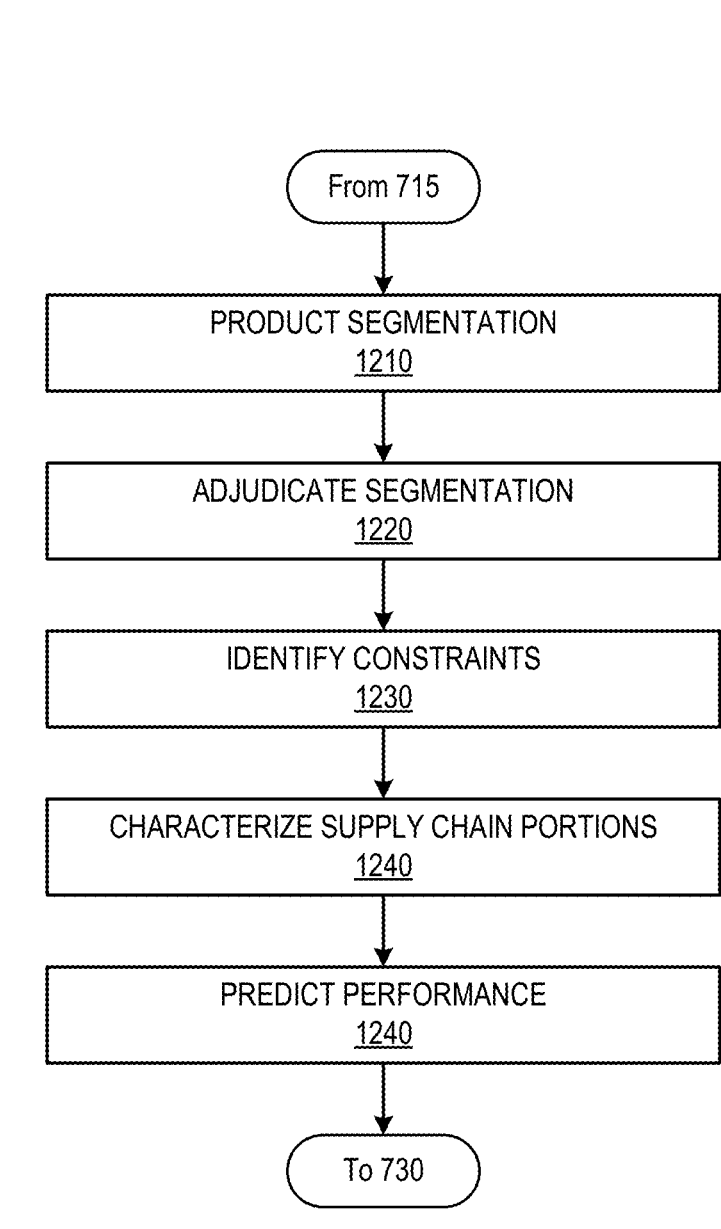
FIG. 12 is a flow diagrams illustrating an example optimization sub-process.

Returning to FIG. 7, after ingestion, the models of optimization are applied (at 720). FIG. 12 provides more detail into this optimization process. Initially, the system may apply grouping logic to products in order to facilitate the supply chain optimization process. In some embodiments, this may be an auto-segmenter that allows the data to automatically identify and suggest a segmentation scheme (at 1210) for the products in the supply chain. There can be multiple simultaneous segmentations or groupings in use at any time, which may have a variety of purposes. Because multiple segmentation or grouping mappings may be used simultaneously, there is also envisioned additional algorithmic structure that can harmonize among different groupings to ensure that ultimately product segmentation or grouping assignments are unique, thus ensuring that parameter assignments are also unique.

An appropriately permissioned user of the system might override the recommended segmentation or grouping of a specific product and set parameters manually (at 1220), known as adjudication of the segmentation. Additionally, when the assigned segmentation or grouping of a product changes over time, such a user may choose to accept or override the newly computed grouping. Adjudication allows users to visualize segmentation or grouping assignments and to assign new values as underlying data or corporate strategies evolve.

Strategic Objective Parameters/Constraints are defined by the user (at 1230) as a driver of the way the optimization process works influencing sensitivity of the model to particular goals and constraints and enabling a level of interactive-ness in the modelling process. This allows the user to identify constraints on allowed supply chain configurations to ensure compliance with both physical limitations of systems and corporate governance and strategy. Other strategic constraints might express business imperatives, such as reducing overall inventory in parts of the supply chain or ensuring that the risk of a stockout of a critical product or group of products be below a specific level.

Subsequently supply chain portions are characterized (at 1240). The objective is to characterize the physical and performance characteristics of the relevant parts of a supply chain quantitatively. The definition of "relevant parts" of a supply chain in this context is any physical or logical aspect of a supply chain that materially influences the selection or computation of optimal supply chain operating parameters. This is an important point, because it is a unique characteristic of the present invention that complete knowledge of all supply chain attributes in a customer's entire supply chain is not required to arrive at quantitatively and qualitatively optimal parameters.

In some embodiments, the characterization may take a number of forms, as previously discussed. For example, the physical attributes of the supply chain network upstream of leaf nodes are assumed to be fixed in one embodiment, whereas in another embodiment the locations and roles of supply chain network nodes upstream from leaf nodes are considered to be fixed, but some of their operational parameters may be optimized subject to system-level constraints. In yet other embodiments, the actual locations and roles of nodes across the entire supply chain may be optimized by the optimization module.

Lastly, the future performance of product delivery under various optimized parameters may be predicted (at 1240). This includes cost and impact computations that incorporate global factors such as environmental impact, cost of regulatory and voluntary offsets of such impacts, and other computed factors that might influence supply chain optimization. Some of these computations incorporate external costs of offset commodities and/or tax rates, which may be modeled, or received as inputs through an interface. In some embodiments, these inputs may be retrieved from live marketplaces in which offset and other global factor commodities are priced and traded in real time, and actual purchase/sale transactions of such commodities may be triggered (and/or executed) as part of the optimization computation (for example in order to ensure that the actual cost of the supply chain is consistent with the optimization computation).

Returning to FIG. 7, after the optimization had been completed, the results may be presented to the client (at 730). Presentation generally includes the pushing of a series of recommendations for improvement to the supply chain activities. It may also include the presentation of the impacts that the changes will have upon costs, service levels, factory changeover, minimum purchases, and the like. In some cases, various "what-if" scenarios may be concurrently presented. As noted in considerable detail above, an important element of the results presentation is to prioritize the changes that are most impactful on the supply chain. Most clients are reticent to make significant changes to their supply chains overnight, as there is a significant risk in doing so. Therefore, by presenting only changes that have the largest impact, the client may be pushed to adopt changes that are most likely to result in a positive outcome. Also, as mentioned previously, in addition to optimization recommendations and results, important suggestions as to data collection and reporting may be pushed to the client's enterprise data management system.

Figure 13A:
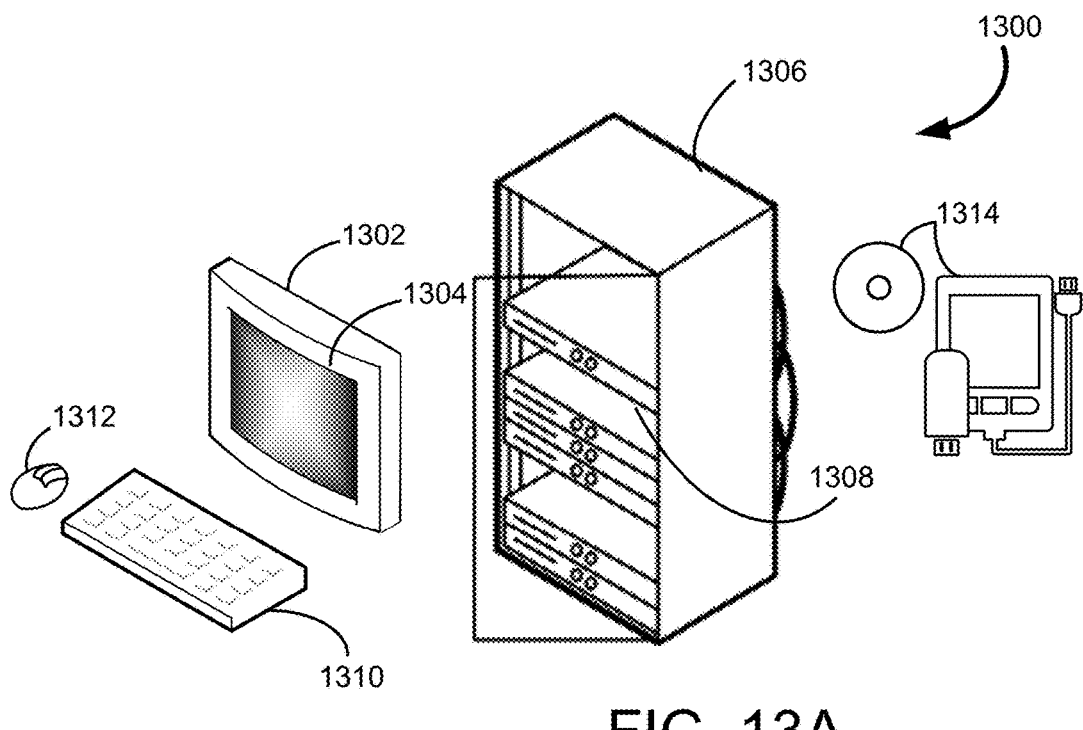
FIGS. 13A and 13B illustrate an exemplary computer system for implementing the Optimizer of FIG. 2.
Figure 13B:
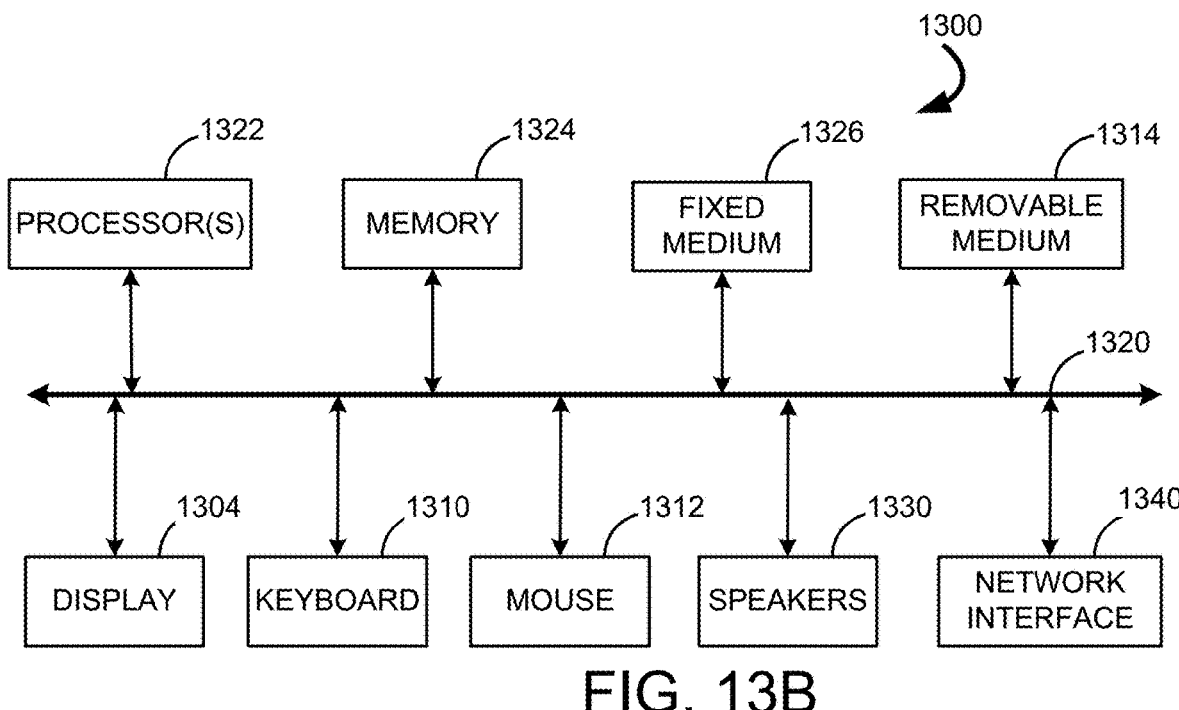

FIGS. 13A and 13B illustrate a Computer System 1300, which is suitable for implementing some embodiments of the present invention. FIG. 13A shows one possible physical form of the Computer System 1300. Of course, the Computer System 1300 may have many physical forms ranging from a printed circuit board, an integrated circuit, and a small handheld device up to a huge supercomputer. Computer system 1300 may include a Monitor 1302, a Display 1304, a Housing 1306, a Disk Drive and or Server Blade 1308, a Keyboard 1310, and a Mouse 1312. External storage 1314 is a computer-readable medium used to transfer data to and from Computer System 1300.

FIG. 13B is an example of a block diagram for Computer System 1300. Attached to System Bus 1320 are a wide variety of subsystems. Processor(s) 1322 (also referred to as central processing units, or CPUs) are coupled to storage devices, including Memory 1324. Memory 1324 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 1326 may also be coupled bi-directionally to the Processor 1322; it provides additional data storage capacity and may also include any of the computer-readable media described below. Fixed Disk 1326 may be used to store programs, data, and the like and is typically a secondary storage medium (such as a hard disk) that is slower than primary storage. It will be appreciated that the information retained within Fixed Disk 1326 may, in appropriate cases, be incorporated in standard fashion as virtual memory in Memory 1324. Removable Storage Medium 1314 may take the form of any of the computer-readable media described below.

Processor 1322 is also coupled to a variety of input/output devices, such as Display 1304, Keyboard 1310, Mouse 1312 and Speakers 1330. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 1322 optionally may be coupled to another computer or telecommunications network using Network Interface 1340. With such a Network Interface 1340, it is contemplated that the Processor 1322 might receive information from the network or might output information to the network in the course of performing the above-described coder marketplace. Furthermore, method embodiments of the present invention may execute solely upon Processor 1322 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs or Blu-ray disks and holographic devices; magneto-optical media such as floppy or optical disks; and hardware devices that are specially configured to store and execute program code, such as application-specific integrated circuits (ASICs), programmable logic devices (PLDs) and ROM and RAM devices such as USB memory sticks. Examples of computer code include machine code, such as produced by a compiler, and files containing higher level code that are executed by a computer using an interpreter.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. In addition, where claim limitations have been identified, for example, by a numeral or letter, they are not intended to imply any specific sequence.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computerized method for data ingestion from a client enterprise data system (EDS) for consumption by a supply chain optimization model, the method comprising:
   receiving raw data in a plurality of data files from a remote EDS, wherein the plurality of data files includes a plurality of tables, and wherein the raw data is non-standardized;
   storing the raw data;
   disambiguating headers of the plurality of tables by:
      initially performing a keyword search and conceptual clustering to standardize headers;
      when the keyword search and conceptual clustering fails then applying a three-pronged advanced disambiguation process of locating physically adjacent words in the table that provide header context, comparison of table file name to the header, and clustering of values in a column below the header against known values and applying a conceptual lexicographic chart to relate the known values to a category;
   applying a plurality of mapping artificial intelligence (AI) models to the disambiguated plurality of tables, wherein each of the plurality of mapping AI models corresponds to a single input in a destination data system to generate a standardized destination data system;
   generating a live preview of an output for each mapping AI model as it is applied; and
   transmitting the generated standardized destination data system for at least one downstream application.

2. The method of claim 1, further comprising normalizing the raw data.

3. The method of claim 2, wherein the normalizing includes imputing values into the plurality of tables.

4. The method of claim 3, where the imputing includes determining if a null value is a true zero, an error, or non-data.

5. The method of claim 1, further comprising determining a sensitivity of a supply chain optimization model to any given value in the raw data.

6. The method of claim 1, further comprising receiving human intervention after the live preview is generated.

7. The method of claim 6, further comprising iteratively altering at least one of the plurality of mapping AI models in response to the human intervention.

8. The method of claim 1, wherein the standardized is one of user defined standard, third-party standard, or default standard.

9. The method of claim 1, further comprising
   optimizing a supply chain by applying a supply chain optimization model to the standardized destination data system;
   determining the most impactful changes to the supply chain responsive to the optimization; and
   transmitting the most impactful changes to the remote EDS.

10. A computerized system for data ingestion from a client enterprise data system (EDS) for consumption by a supply chain optimization model, the system comprising:

a network connection for receiving raw data in a plurality of data files from a remote EDS, wherein the plurality of data files includes a plurality of tables, and wherein the raw data is non-standardized;

a database for storing the raw data;

a server for executing computer code to:

disambiguate headers of the plurality of tables by:

initially performing a keyword search and conceptual clustering to standardize headers;

when the keyword search and conceptual clustering fails then applying a three-pronged advanced disambiguation process of locating physically adjacent words in the table that provide header context, comparison of table file name to the header, and clustering of values in a column below the header against known values and applying a conceptual lexicographic chart to relate the known values to a category;

apply a plurality of mapping artificial intelligence (AI) models to the disambiguated plurality of tables, wherein each of the plurality of mapping AI models corresponds to a single input of a destination data system of a supply chain optimization model to generate a standardized destination data system;

generate a live preview of an output for each mapping AI model as it is applied; and transmit the generated standardized destination data system for at least one downstream application.

11. The system of claim 10, wherein the server further normalizes the raw data.

12. The system of claim 11, wherein the normalizing includes imputing values into the plurality of tables.

13. The system of claim 12, where the imputing includes determining if a null value is a true zero, an error, or non-data.

14. The system of claim 10, wherein the server further determines a sensitivity of the supply chain optimization model to any given value in the raw data.

15. The system of claim 10, further comprising an interface for receiving human intervention after the live preview is generated.

16. The system of claim 15, wherein the server further iteratively alters at least one of the plurality of mapping AI models in response to the human intervention.

17. The system of claim 10, wherein the standardized is one of user defined standard, third party standard, or default standard.

18. The system of claim 10, further comprising a second server configured to perform the steps of:

optimizing a supply chain by applying a supply chain optimization model to the standardized feature set;

determining the most impactful changes to the supply chain responsive to the optimization; and transmitting the most impactful changes to the remote EDS.

\*   \*   \*   \*   \*